United States Patent [19]
Roffe et al.

[11] Patent Number: 5,442,785
[45] Date of Patent: Aug. 15, 1995

[54] METHOD AND APPARATUS FOR PASSING MESSAGES BETWEEN APPLICATION PROGRAMS ON HOST PROCESSORS COUPLED TO A RECORD LOCK PROCESSOR

[75] Inventors: James Roffe, Blaine; Donald N. Hester, Jr., Oakdale, both of Minn.

[73] Assignee: Unisys Corporation, Blue Bell, Pa.

[21] Appl. No.: 221,281

[22] Filed: Mar. 31, 1994

Related U.S. Application Data

[63] Continuation of Ser. No. 773,174, Oct. 8, 1991, abandoned.

[51] Int. Cl.⁶ .................. G06F 12/14; G06F 15/40
[52] U.S. Cl. .................. 395/658; 364/DIG. 1; 364/246.6; 364/282.1; 364/284.3; 364/286.4; 364/222.81
[58] Field of Search ............... 395/200, 600, 425, 325, 395/650, 725

[56] References Cited

U.S. PATENT DOCUMENTS

| | | | |
|---|---|---|---|
| 4,414,624 | 11/1983 | Summer, Jr. et al. | 395/650 |
| 4,694,396 | 9/1987 | Weisshaar et al. | 395/200 |
| 5,067,071 | 11/1991 | Shanin et al. | 395/275 |
| 5,140,685 | 8/1992 | Sipple et al. | 395/425 |
| 5,161,227 | 11/1992 | Dias et al. | 395/650 |
| 5,212,778 | 5/1993 | Dally et al. | 395/400 |
| 5,224,215 | 6/1993 | Disbrow | 395/250 |
| 5,226,143 | 7/1993 | Baird et al. | 395/425 |
| 5,257,369 | 10/1993 | Skeen et al. | 395/650 |
| 5,285,528 | 2/1994 | Hart | 395/725 |

*Primary Examiner*—Thomas G. Black
*Assistant Examiner*—Wayne Amsbury
*Attorney, Agent, or Firm*—LeRoy D. Maunu; Charles A. Johnson; Mark T. Starr

[57] ABSTRACT

A method and apparatus for coordinating activities of data base management systems operable on Closely-Coupled Host Processors. In particular, messages can be quickly passed between data base management systems executing on Host Processors which are coupled to a Record Lock Processor. One or more receiver processes register with the operating system to receive messages. When the operating system detects a message a Receiver Process begins processing the message. When a data base management system detects that other data base management systems should be notified of an event, a message sending interface is called with a parameter which indicates particular Host Processors and a parameter containing the message to send, and the message is sent to the Host Processors specified. Programs sending messages may elect to have execution suspended until a response message is received from the other Host Processors. When a program which has sent a message is suspended, information regarding the suspended program is placed in a queue which stores information from other suspended programs. A timeout function periodically checks the queue for programs which have been suspended for an extended length of time, and resumes execution of those suspended programs where the time for which the program has been suspended exceeds some predetermined length of time.

7 Claims, 18 Drawing Sheets

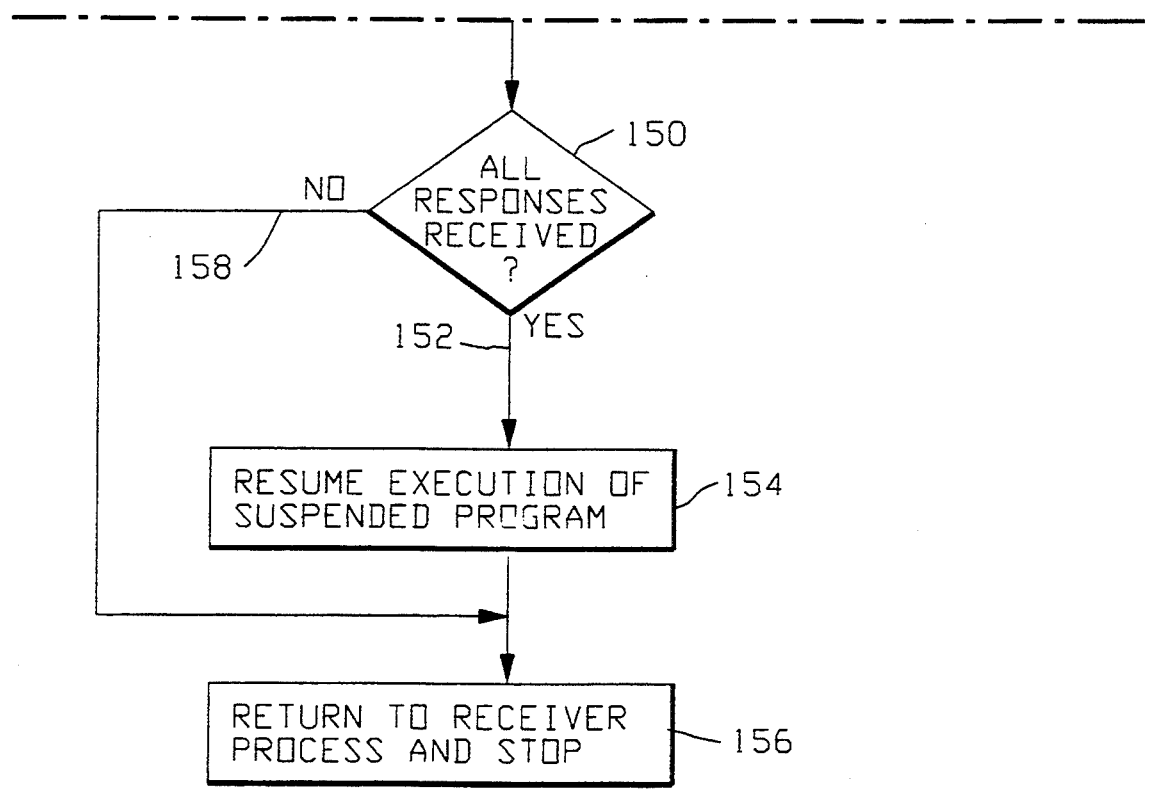
FIG. 3c
FIG. 3
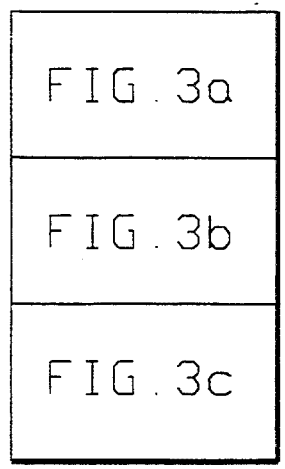

METHOD AND APPARATUS FOR PASSING MESSAGES BETWEEN APPLICATION PROGRAMS ON HOST PROCESSORS COUPLED TO A RECORD LOCK PROCESSOR

CROSS REFERENCE TO APPLICATIONS

This is a continuation of application(s) Ser. No. 07/773,174 filed on Oct. 8, 1991, now abandoned.

The present application is related to U.S. Pat. No. 5,140,685, filed Sep. 16, 1991, entitled "Record Lock Processing for Multiprocessing Data System", assigned to the assignee of the present invention, which is a Continuation of patent application Ser. No. 669,788, filed Mar. 15, 1991, now abandoned, which was a Continuation of patent application Ser. No. 167,748, filed Mar. 14, 1988, now abandoned. U.S. Pat. No. 5,140,685 is incorporated herein by reference.

BACKGROUND OF THE INVENTION

1. Field of Invention

This invention relates to synchronization of application programs which execute on host processors which are not tightly-coupled, and which process shared data.

2. General Discussion

In the discussion of the invention, the following terms will have the meanings set forth:

a. Centralized Data Base Management System—a Data Base Management System in which the processing logic executes on a single Host Processor.

b. Closely-Coupled—is the relationship of Instruction Processors in which the Instruction Processors do not share the same addressable memory space, but share some Mass Storage, and the relationship of Host Processors in which the Host Processors share some Mass Storage between them.

c. Distributed Data Base Management System—is Data Base Management System for controlling a collection of multiple, logically interrelated data bases distributed over Host Processors interconnected by a communications network.

d. Host Processor—is a data processing system which has one or more Instruction Processors, executing an Operating System and intercoupled, for executing programmed instructions, and an addressable memory which is shared among the Instruction Processors.

e. Instruction Processor—is that functional portion of a data processing system in which machine instructions for the data processing system are executed.

f. Loosely-Coupled—is the relationship of Instruction Processors and associated addressable memory in which the Instruction Processors do not share the same addressable memory space or Mass Storage, but have some type of communication link between them.

g. Mass Storage—is addressable memory which is used for secondary and long-term storage of data, formatted as files, blocks, and records, and is accessible to programs executing on a particular Host Processor.

h. Shared Data Base Management System—is a Data Base Management System where the processing logic is distributed among several Host Processors while the data base is stored on Mass Storage which is shared by each of the Host Processors.

i. Tightly-Coupled—is the relationship between Instruction Processors and associated addressable memory in which the Instruction Processors share the same addressable memory space.

In today's computing environments, application programs are sometimes distributed over one or more Host Processors to enhance performance. To the extent the distributed application programs share resources and data, they need to coordinate activities to avoid deadlock situations and data corruption. The application programs accomplish this coordination by passing pertinent information amongst themselves. One area in which application programs are typically distributed is Data base Management Systems (DBMS).

The usefulness of the present invention and how it can be used to enhance the performance of application programs, and DBMSs in particular, can be appreciated from the following brief overview of the various approaches in deploying Data Base Management Systems. Briefly, Data Base Management Systems are classified as 1) Centralized, 2) Distributed, and 3) Shared.

A Centralized DBMS can be defined as a DBMS in which the processing logic executes on a Host Processor. The data base is stored on Mass Storage which is dedicated to the Host Processor, and users interact with the DBMS through remote terminals which are coupled to the Host Processor through communications hardware and software.

While the Centralized DBMS architecture offers the advantage of suitability for transaction intense applications—such as airline reservation systems—disadvantages inherent in the design are largely a result of contention for memory and input/output resources by the various data base application programs. Because the Instruction Processors comprising the Host Processor share the same addressable memory space, expansion of the processing capacity to meet additional demand becomes costly in that entire Host Processors may have to be replaced. Furthermore, with all Instruction Processors sharing input/output channels and memory, the risk of a single point of failure that will disable the entire system is high.

The Distributed DBMS model seeks to alleviate some of the weaknesses present in the Centralized DBMS approach. A distributed data base is a collection of multiple, logically interrelated data bases distributed over Host Processors interconnected by a communications network. A Distributed DBMS is a software system that permits the management of the distributed data bases and makes the distribution transparent to the users, as described by Tamer M. Ozsu and Patrick Valduriez, Principles of Distributed Data base Systems, (New Jersey: Prentice Hall, 1991) p 4.

The advantages offered by the Distributed DBMS model cited by Ozsu include: 1) frequently used data is close to the user; 2) distributing the processing logic increases performance through parallel processing; 3) processing capacity can be increased in a modular fashion; 4) and distribution of data and processing decreases the likelihood of a single point of failure.

While the Distributed DBMS approach solves some of the problems presented by the Centralized DBMS approach, it brings with it new problems. First, the complexity of a Distributed DBMS is compounded because each processing component must synchronize and coordinate with other components to ensure that every change in a local copy of a data base is reflected in all other copies of the data base. Second, in a transaction intensive application, a Distributed DBMS approach may be slow because of the necessary coordination between the DBMSs on each of the Host Processors. Finally, many businesses have invested heavily in DBMSs utilizing a Centralized approach. To distribute a centralized application would prove costly and difficult as noted by Ozsu and Valduriez, Principles of Distributed Data base Systems at page 9.

A Shared DBMS has characteristics common to both the Centralized and Distributed approaches to DBMSs. The Shared DBMS model consists of a plurality of Closely-Coupled Host Processors, each of which has its own private Mass Storage. The data base processing logic is distributed among the Host Processors while the data base is stored on Mass Storage which is shared by each of the Host Processors.

The Shared DBMS approach in which the present invention is used is distinguishable from those approaches where a data base is shared among a plurality of Loosely-Coupled Host Processors and the DBMS communication is via an inter-Host Processor communications network. In other shared data base approaches, one Host Processor, the server, is responsible for providing access to the data base. The other Host Processors direct all data base queries to the server through the communications network.

The DBMS in which the present invention is used, in contrast to other shared data base approaches, is implemented in an environment in which the Host Processors are Closely-Coupled. The Closely-Coupled system has all Host Processors sharing a data base and directly coupled to a Multi-Host File Sharing system which is commercially available from Unisys Corporation. The Multi-Host File Sharing system controls Mass Storage and allows the coupled Host Processors to share the data available on the Mass Storage. Coordination of data base update activities is accomplished through a Record Lock Processor (RLP), which is commercially available from the Unisys Corporation and is described in the cross-referenced patent application, "Record Lock Processing for a Multiprocessing Data System", which is incorporated by reference.

The Shared DBMS approach in which the present invention is used offers the advantages of parallel processing power, limited risk for a single point of failure, incrementally expandable processing power, and compatibility with existing data base applications.

Having described the various models for DBMSs and the DBMS in which the present invention is used, two particular instances where the present invention may be used in a DBMS in which the respective Host Processors are Closely-Coupled will be described next.

In any DBMS where there are multiple applications seeking access to a common data base, one problem that must be addressed is that of concurrency control. Where there are multiple applications seeking to update a data base, access to the data base must be controlled in such a manner so as to ensure data base integrity. In the Shared DBMS approach, concurrency control is accomplished with the previously mentioned Record Lock Processor (RLP). The RLP is directly coupled to each Host Processor sharing a data base. The respective DBMSs can gain exclusive, update protected, or shared access to files, blocks, and records by using the RLP, thereby ensuring a consistent view of the shared data.

While the RLP solves one set of problems relating to concurrency control between DBMSs on Closely-Coupled Host Processors, the locking approach is not appropriate for another set of problems relating to concurrency control. In particular, certain situations encountered by one DBMS may be such that the other DBMSs should be notified of the situation. In these instances, a message is sent to the other DBMSs to call attention to the particular situation. Two specific examples where one DBMS needs to notify another DBMS are set forth below.

One situation where a fast message passing scheme is desirable is where the DBMS user determines that, for possible recovery needs, a file is to be made unavailable to normal DBMS access while the user is making a backup copy of the file to tape, reloading an older copy of the file from tape, or performing some other maintenance function on the file. This cannot be accomplished with the RLP locking mechanism because locks are associated with DBMS activities and the file must remain in an unavailable state even after the user making the request has terminated its DBMS access. Because there may be a person sitting at a terminal, waiting for a response from the DBMS, the message passing between DBMSs on the Closely-Coupled Host Processors must be done as quickly as possible.

The scenario in the foregoing situation would be as follows: A first DBMS on a Host Processor marks a file is unavailable so access to the file is denied to normal DBMS transactions. The first DBMS then sends a message to DBMSs on other Host Processors which are sharing the file. After receiving the message sent, each of the receiving DBMSs marks the file as unavailable, thereby denying access to the file by local applications, and each of the receiving DBMSs sends a response back to the first DBMS to acknowledge that the operation is complete. When the first DBMS has received a response message from each of the DBMSs to which the message was sent, it then notifies the user that the operation has completed, allowing the user to continue with whatever maintenance function is desired.

A second situation in which it is desirable that a fast message passing mechanism be used between DBMSs is when a dynamic dump is requested by a DBMS user. A dynamic dump saves audit information to tape regarding changes to a data base while allowing DBMS application programs continued access to the data base. The results of the dynamic dump can then be used at a later time should the need arise to reconstruct the data base. For a dynamic dump to be usable, the start time of the oldest DBMS application program currently processing the data base needs to be identified and stored with the dump information. The oldest start time of all the DBMS application programs on the Closely-Coupled Host Processors must be obtained. The precise reason for this identification is beyond the scope of the discussion for the present invention and will be omitted for the sake of clarity.

The scenario in the second case would be as follows: A first DBMS receives a request to take a dynamic dump. Before performing the dynamic dump, the first DBMS must determine the start time of the oldest DBMS application program. To determine this, the first DBMS sends a message to the DBMSs on each of the Closely-Coupled Host Processors. Each of the DBMSs receiving the message determines the oldest start time of the DBMS-application programs on their respective Host Processor, and sends a response message back to the first DBMS which includes the oldest start time obtained. When the first DBMS has received a response message from each of the DBMS to which the message was sent, it determines, using the information returned in the response messages, the oldest start time. The oldest start time is then recorded with the dump information. Because there may a user waiting at a terminal for the dump to complete, the message passing process must be completed as quickly as possible.

The preceding problems are typically addressed using some sort of message passing mechanism. In a data processing environment where the Instruction Processors are Tightly-Coupled, a message can be passed from one Instruction Processor to another via a shared memory segment. In a data processing environment where the Instruction Processors are Loosely-Coupled, messages can be passed via an inter-Host Processor communications network. With the architecture in which the present invention is used, the shared memory message passing scheme is not an option because the Instruction Processors on which the DBMSs execute are not Tightly-Coupled, and the communication network method to pass messages is not a viable option due to the speed requirements of a transaction intensive environment. Thus, it can be seen that a fast method of communication between DBMSs on Closely-Coupled Host Processors is required.

SUMMARY OF THE INVENTION

A primary objective of the invention is to provide an improved message transmission system for providing fast communication between Data Base Management Systems operating on Closely-Coupled Host Processors.

It is another object of the present invention to provide a method and apparatus for quickly sending and receiving messages sent between sending application programs and receiving application programs which are executing on Host Processors which are coupled to a Record Lock Processor. In particular, a program callable routine for sending messages through a Record Lock Processor is provided, which is able to send messages to those Host Processors selected by the calling application program. A receiving process is provided which calls the appropriate receiving application program when a message arrives from the Record Lock Processor.

It is yet another object of the present invention to provide a means for synchronizing application program operation by providing a sending application program the capability to wait for a response message from receiving application programs, indicating readiness to resume processing by the sending application program. This is accomplished by suspending execution of a sending application program until all the expected response messages are received. This capability gives application programs a fast way to synchronize operations.

Still another objective of the invention is to provide a means for preventing indefinite suspension of execution of sending application programs. When a sending application program is suspended and waiting for a response message, the present invention provides a means for periodically checking all suspended sending application programs for those which have been waiting for an extended length of time. When the time suspended exceeds some predetermined value, the sending application program is restarted. This keeps a sending application program, which is waiting for a response, from having execution suspended indefinitely.

A further object of the present invention to provide a means where all incoming messages can be processed by a receiver process as quickly as possible. When a receiver process receives a message to process, that receiver process is no longer available to process any other incoming messages. This is accomplished by starting a plurality of receiver processes to await incoming messages. When a receiver process is started to process a message, it immediately starts another receiver process so that there is a surrogate receiver process available to process another message.

The foregoing objectives, and other more detailed objectives of the invention will become apparent from a consideration of the Drawings and the following detailed description of the preferred embodiment of the invention.

DETAILED DESCRIPTION OF THE PREFERRED EMBODIMENT

Figure 1:
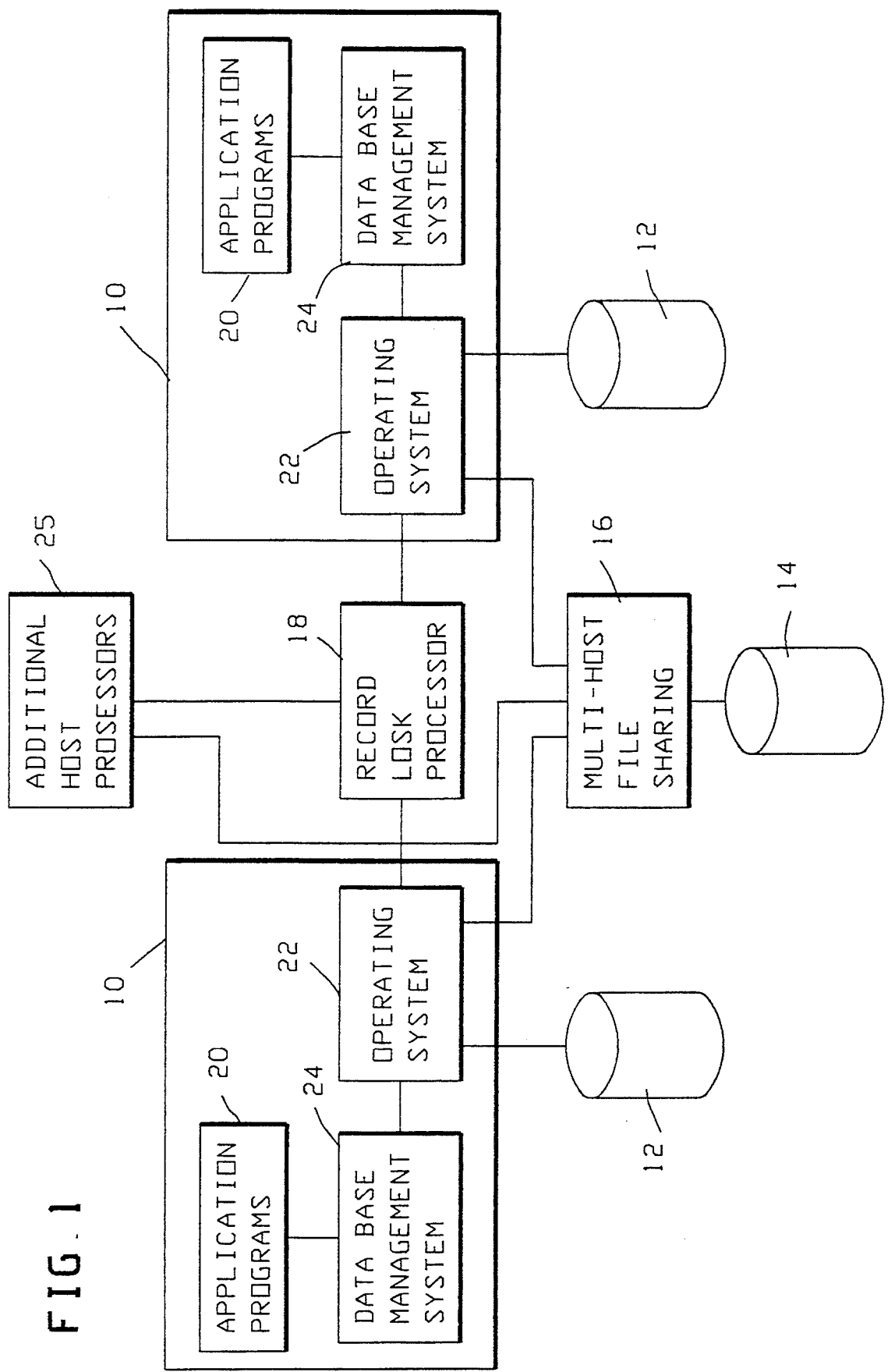
FIG. 1 is a block diagram of a Closely-Coupled Data Processing System.

FIG. 1 is a block diagram of a Closely-Coupled Data Processing System. Each Host Processor 10 could be a model 2200/600, which is commercially available from the Unisys Corporation, or another general purpose data processing system. Coupled to each Host Processor is Mass Storage 12 for secondary and long-term storage of data which is accessible by the coupled Host Processor. Mass Storage 14 is coupled to a Multi-Host File Sharing System (MHFS) 16 which is commercially available from the Unisys Corporation. The MHFS 16 allows Host Processors 10 which are coupled to the MHFS to store and retrieve data from the Mass Storage 14 controlled by the MHFS. A Record Lock Processor (RLP) 18 is directly coupled to each Host Processor 10 and coordinates locking of files, blocks, and data base records between Application Programs 20 on each of the Host Processors 10 coupled to the RLP 18. Block 25 represents additional Host Processors which may be coupled to the Record Lock Processor 18 and the Multi-host File Sharing system 16.

Within each Host Processor 10 are blocks which represent software executing on each of the Host Processors. In particular, each Host Processor 10 has its own Operating System 22 to control allocation of the Host Processor resources available to Application Programs 20. Each Host Processor is shown with a Data Base Management System (DBMS) 24 for managing records of a data base. The Operating System 22 provides the software interface between the DBMS and the local Mass Storage 12, the shared Mass Storage 14, and the Record Lock Processor 18. The environment in which the present invention is used has the same DBMS 24 deployed on each of the Host Processors, and Application Programs 20 which vary from Host Processor to Host Processor. Those skilled in the art will recognized that varying levels of reflectivity between the software and hardware comprising each Host Processor can be used without departing from the spirit of the present invention.

Figure 2:
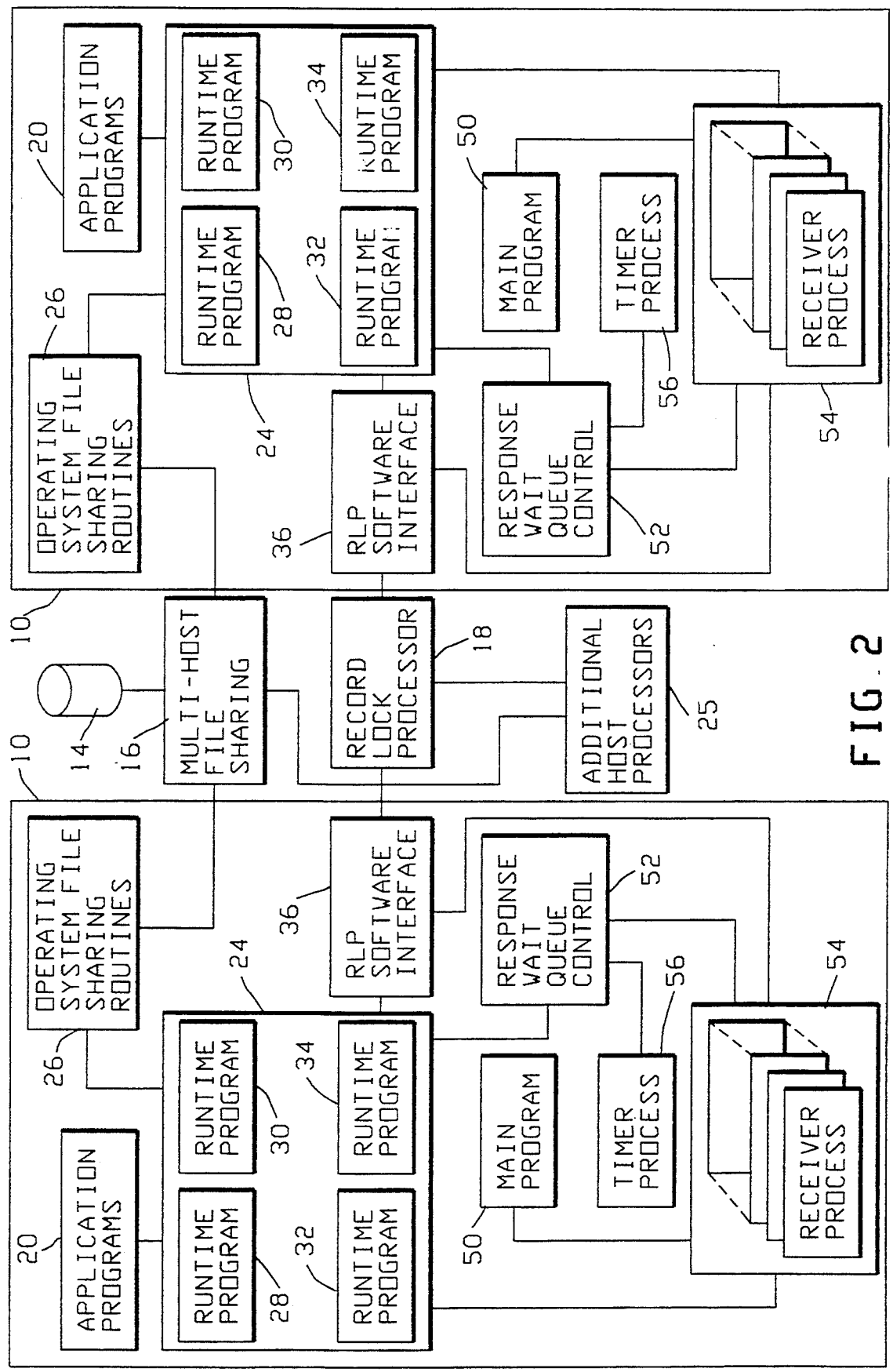
FIG. 2 is a software block diagram of the present invention, further including Closely-Coupled Host Processors and a DBMS.

FIG. 2 is a software block diagram of the present invention, further including Closely-Coupled Host Processors and a DBMS. The software is deployed on two Host Processors 10. It should be understood that each Host Processor is Closely-Coupled. That is, each Host Processor has access to data stored on shared Mass Storage 14 which is coupled to a Multi-Host File Sharing system 16. A program, such as a DBMS 24, can store and retrieve data on the shared Mass Storage 14 through the Operating System File Sharing Routines 26 which provide a software interface to the shared Mass Storage 14. Each Host Processor 10 is coupled to RLP 18 for purposes of locking records and sending messages. Even though only two Host Processors 10 are shown in diagram, block 25 is shown to indicate that additional Host Processors may be coupled to the RLP 18 and Multi-Host File Sharing system 16.

For the purpose of this description, the software modules shown in FIG. 2 can be logically divided into three functional areas: 1) those comprising the DBMS; 2) the software to the RLP; and 3) those used to implement the present invention. Each area is described below.

Block 24 shows a program, in this case a DBMS, which could use the present invention. The DBMS consists of a collection of Runtime Programs, 28, 30, 32, and 34, which are used to manage a data base and called by Application Programs 20 using the DBMS. The number of Runtime Programs may vary for various systems, it being understood that each of the Runtime Programs performs certain predetermined functions. For instance, Runtime Program 32 could be responsible for performing housekeeping and monitoring functions relating the DBMS. Runtime Program 34 might have responsibility for control and coordination of Application Programs 20 using the DBMS. Because there is a DBMS 24 on each of the Host Processors 10, each DBMS 24 must be notified of environmental changes occurring for DBMSs on the Closely-Coupled Host Processors. Those skilled in the art will recognize that the structure and functionality of the various Runtime Programs comprising a DBMS will widely vary and that applications other than a DBMS might use the present invention.

The RLP Software Interface 36 is part of the OS/2200 Operating System and provides two supporting functions for the purposes of the present invention. First, the Interface provides a means for the DBMS 24 to send messages through the RLP 18 to DBMSs on Additional Host Processors 25 which are also coupled to the RLP. Second, the Interface 36 provides a means by which messages can be received from DBMSs executing on Additional Host Processors 25 coupled to the RLP.

Four main software modules are used to implement the present invention, a Main Program 50, a Response Wait Queue Control (RWQC) 52, one or more Receiver Processes 54, and a Timer Process 56. The Main Program 50 is a separate executable program which starts one or more Receiver Processes 54 and a Timer Process 56, each of which operates independently from the Main program. The RWQC 52 is a software module which contains processing logic to coordinate suspension of programs sending messages, and processing responses to messages sent where there are a plurality of programs which have sent a message and are suspended. When the RLP Software Interface 36 receives a message from the RLP 18, a Receiver Process 54 is activated to process the message. The Timer Process 56 periodically checks a queue, maintained by the Response Wait Queue Control 52, for programs which are waiting for a response message. The lines connecting each of the blocks in FIG. 2 represent the flow of control between each of the software modules. The particular relationships are made apparent in the descriptions accompanying the flow charts for each of the software modules.

Figure 3A:
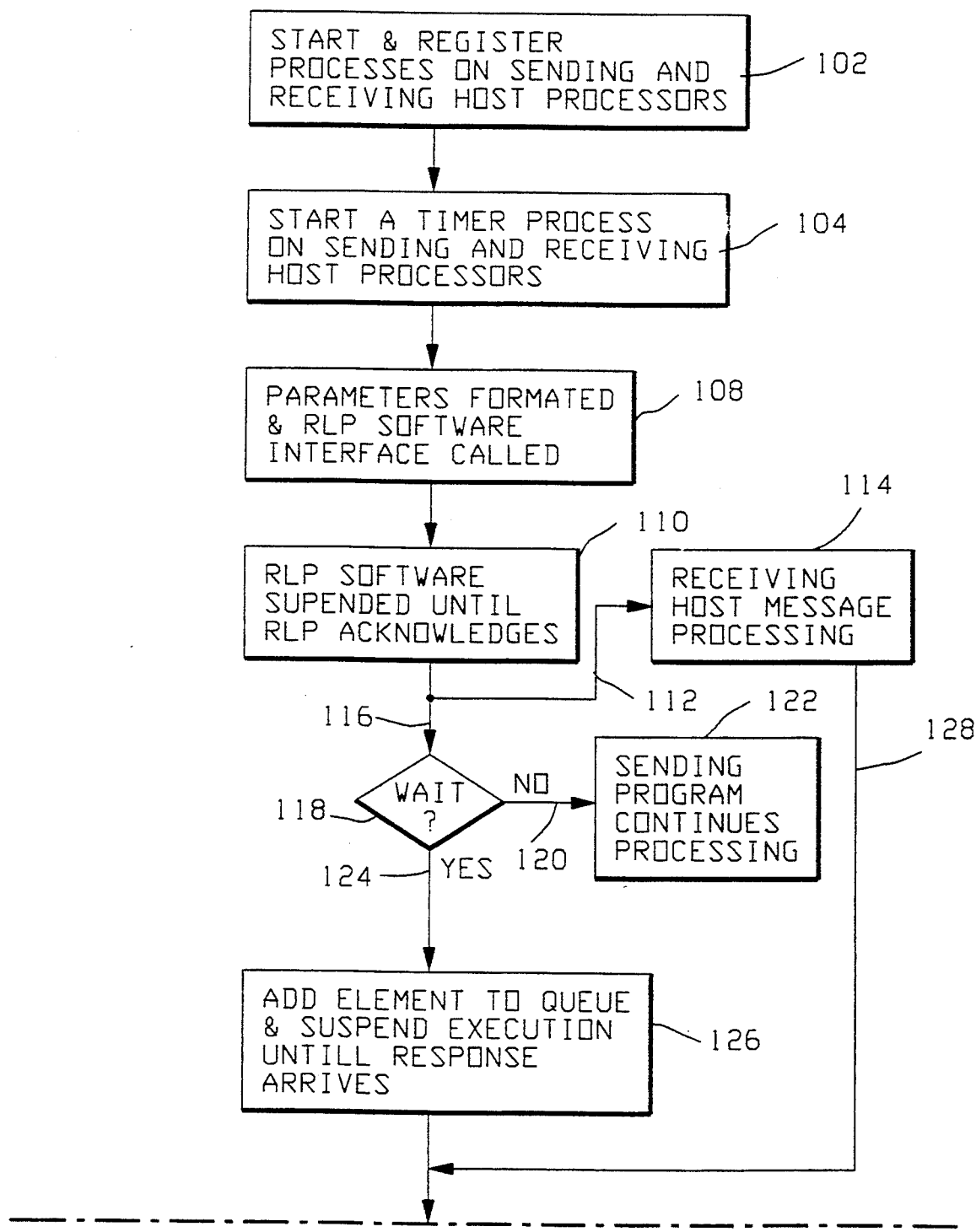
FIG. 3 is an overall control flow chart, for the software modules shown in FIG. 2, which shows the processing for passing a message between application programs on a Host Processor sending a message and application programs on those Host Processors receiving the message.
Figure 3B:
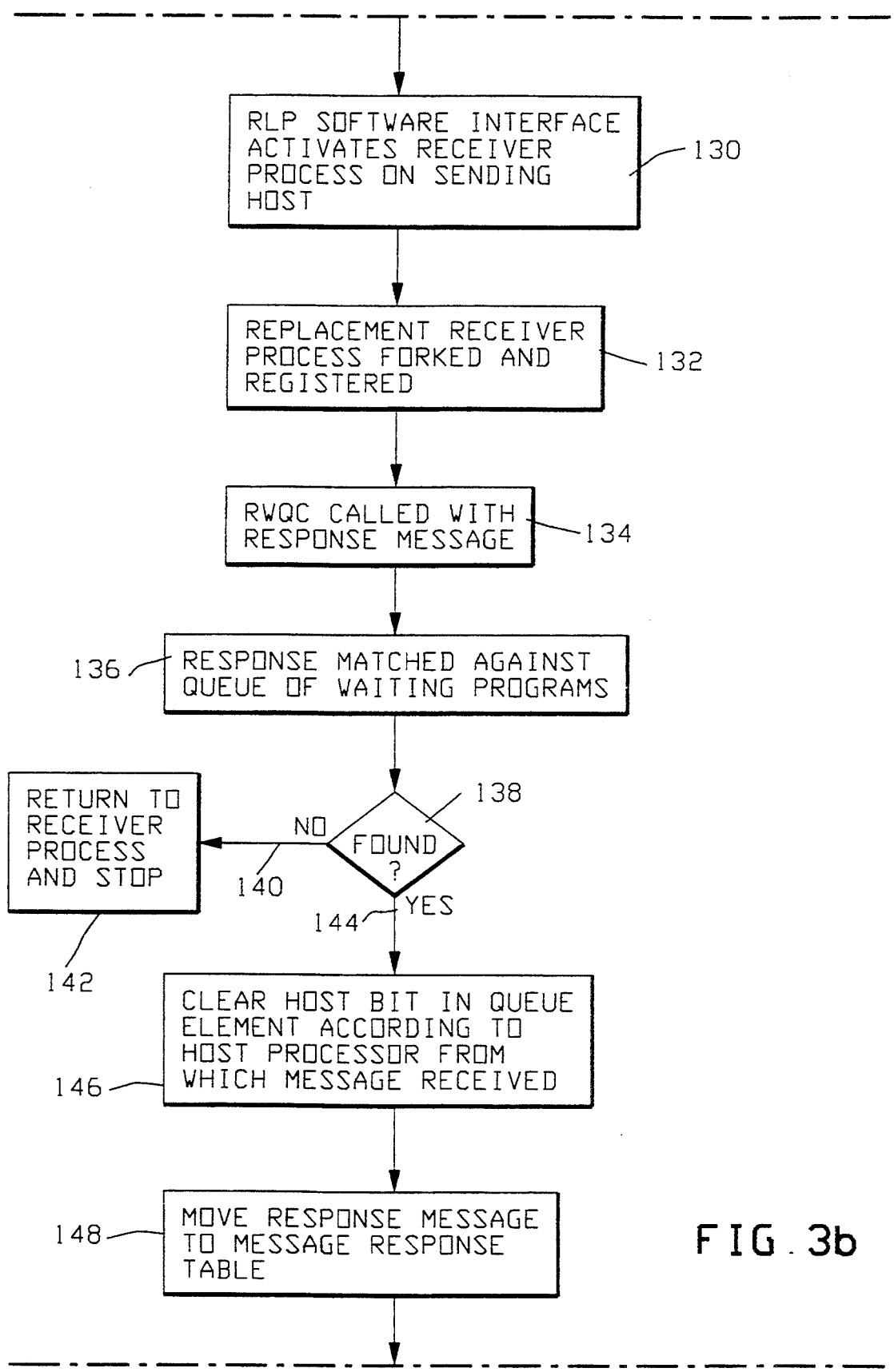

FIG. 3 is an overall control flow chart, for the software modules shown in FIG. 2, which shows the processing for passing a message between application programs on a Host Processor 10 sending a message and application programs on those Host Processors receiving the message. Processing begins with operation 102 starting and registering one or more Receiver Processes 54 on each of the Host Processors on which application programs are to participate in passing messages. The Host Processors from which an application program is sending a message will be referred to as the "Sending Host Processor", and the Host Processor(s) to which the message is directed will be referred to as the "Receiving Host Processor(s)". Operation 104 starts a Timer Process 56 on each of the Sending and Receiving Host Processors.

At operation 108, a Runtime Program 32 on a Sending Host Processor formats the parameters for the RLP Software Interface 36, and then calls the RLP Software Interface with a message to send.

After the RLP Software Interface 36 is called, operation 110 shows that program execution is suspended until the RLP acknowledges receipt of the message. After acknowledging receipt of the message, the RLP sends the message to the specified Receiving Host Processor(s). Control path 112 leads to the initiation of processing on the Receiving Host Processor(s), and operation 114 shows Receiving Host Processor message processing. The processing for the Receiving Host Processor(s) is shown in greater detail in FIG. 4.

At the same time that the Receiving Host Processor(s) is performing its message processing, control path 116 shows that processing continues on the Sending Host Processor at test 118. Test 118 checks whether the Runtime Program sending the message desires to wait for a response from the Receiving Host Processor(s). If waiting for a response is not necessary, control path 120 leads to operation 122, where processing by the Runtime Program 32 continues. If the wait option is necessary, control path 124 leads to operation 126, which adds an element to a queue of programs waiting for a response message, and suspends execution of the Runtime Program 32 until all desired responses have arrived.

Control path 128 shows continuation of message processing on the Sending Host Processor after a Receiving Host Processor has sent a response. Operation 130 activates a Receiver Process 54 on the Sending Host Processor to process the response sent from the Receiving Host Processor. After the Receiver Process is activated, operation 132 forks and registers another Receiver Process 54 for availability to process messages from the RLP Software Interface 36. Forking a Receiver Process has the effect of starting a whole new Receiver Process which is in itself a separate executable program.

After another Receiver Process has been started, at operation 134, the Response Wait Queue Control (RWQC) is called with the response message received. Operation 136 searches the queue of waiting programs for the program which is waiting for this response message. Test 138 determines whether a suspended program was found which matches the response message. If no suspended program was found, control path 140 leads to operation 142 where control is returned to the Receiver Process and processing stops. If a suspended program was found which matches the response message, control path 144 leads to operation 146. Operation 146 clears a control bit, corresponding to the Receiving Host Processor which sent the response, in the queue element of the suspended program.

Operation 148 moves the response message to the a table on the Sending Host Processor so that the sending Runtime Program 32 can process the response message.

Test 150 checks whether all responses have been received from the Receiving Host Processors. This is checked by testing bits in the queue element of the suspended program. If test 150 finds that all responses have been received, control path 152 leads to operation 154, which resumes execution of the suspended program. Operation 156 returns control to the Receiver Process, and stops processing. If test 150 finds that more responses are expected, control path 158 leads to operation 156.

Figure 4:
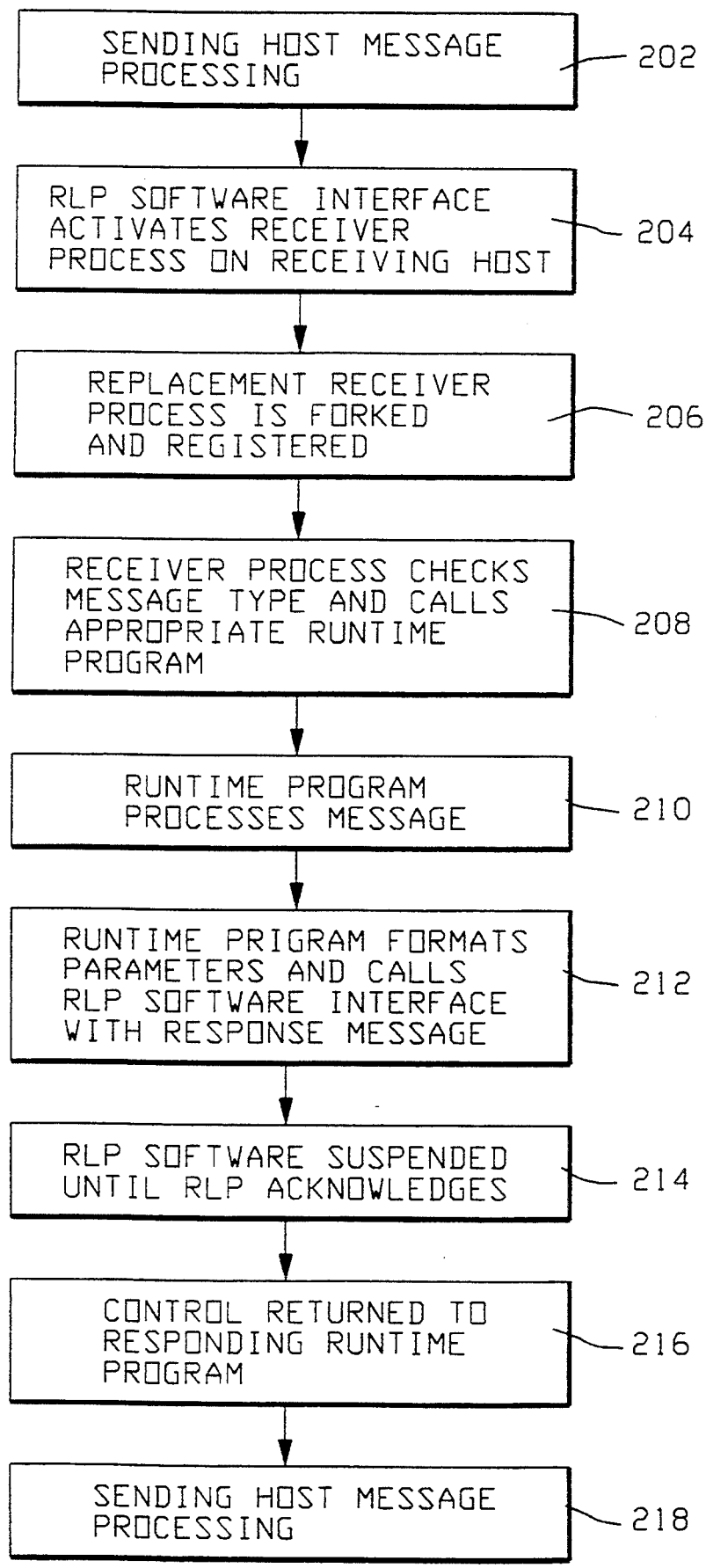
FIG. 4 is a companion to the flow chart of FIG. 3, and shows the overall processing on the Host Processor(s) receiving a message.

FIG. 4 is a companion to the flow chart of FIG. 3, and shows the overall processing on the Host Processor(s) receiving a message. Operation 202 signifies the processing on the Sending Host Processor which has occurred prior to initiation of message processing on a Receiving Host Processor.

When a message is received, the RLP Software Interface 36 activates a Receiver Process 54 on the Receiving Host Processor as shown in operation 204. Operation 206 then forks and registers a replacement Receiver Process for the newly activated Receiver Process.

Operation 208 shows the activated Receiver Process checking the message type and calling the Runtime Program 32 as specified in the message type. At operation 210, the Runtime Program 32 performs its application dependent processing of the message. Upon completion of message processing, the Runtime Program 32 formats parameters for sending a response message and calls the RLP Software Interface with a send message function and a response type message, as indicated in operation 212.

Operation 214 suspends the RLP Software Interface until the RLP acknowledges receipt of the message.

After the RLP has acknowledged receipt of the response message, operation 216 returns control to the responding Runtime Program 32. Operation 218 signifies resumption of processing on the Sending Host Processor with respect to the response message sent.

An Operating System providing an RLP Software Interface 36 is the OS/2200, operable with the 2200 Series of data processing system commercially available from the Unisys Corporation. In OS/2200, there are two routines which provide an application program callable interface to send messages using the RLP. The first routine is referenced by the mnemonic "ER RLPMSG$", and provides for operation in a basic addressable memory space. The second routine, basically providing the same functionality, is referenced by the mnemonic "CALL UDSRLP$MSG". The only difference between the two routines is that the UDSRLP$MSG routine is available for the extended addressing capabilities of the OS/2200. The extended addressing capability allows the calling program to address a larger memory space. In the discussion which follows each routine and the underlying support software is referred to as the RLP Software Interface.

Each routine of the described RLP Software Interface expects the same format for each of two parameters which are passed to it. A description of the required format for each of the parameters follows.

Figure 5A:
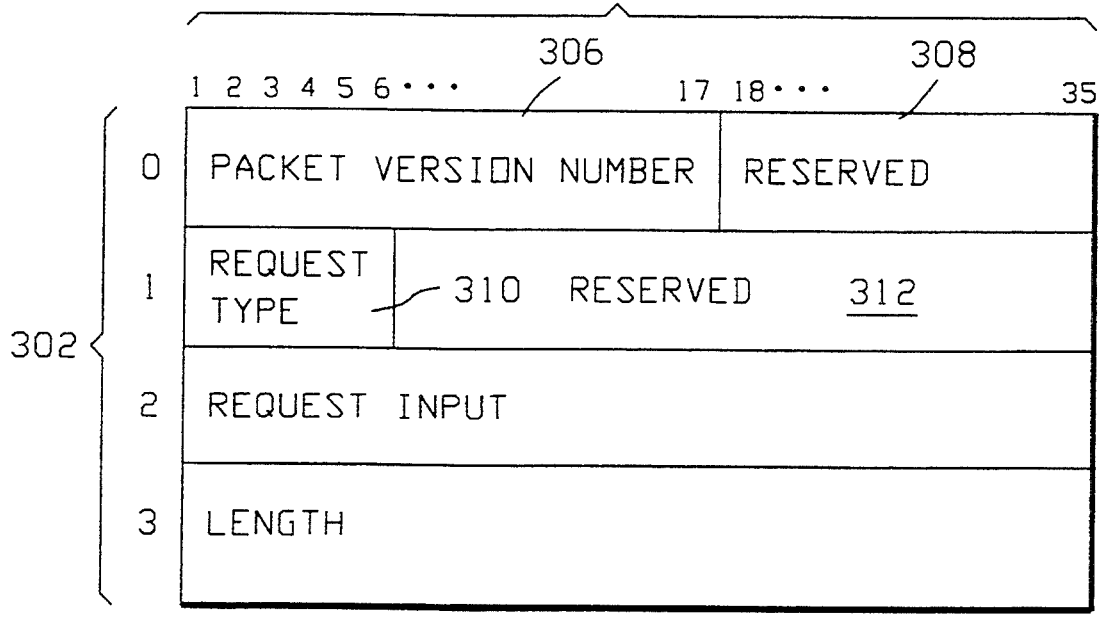
FIG. 5a illustrates the packet format for the first parameter passed to the RLP Software Interface, indicating a function to perform.

FIG. 5a illustrates the packet format for the first parameter passed the RLP Software Interface. The required packet length is four words with each word having 36 bits. The words 302 are numbered 0 through 3, and the bit positions 304 within each word are numbered 0 through 35.

A group of bits 306, being bits 0 through 17 of word 0 define the packet version number. This partial word is set by the-caller and should be set to match that version number which the RLP Software Interface expects. This is used to ensure that the calling routine is sending the appropriate information to the version of the RLP Software Interface being called. A second group of bits 308, being bits 18 through 35 of word 0, are reserved for future use and must be set to zero.

A Request Type 310 is set forth in bits 0 through 5 310 of word 1, and provide the indication to the RLP Software Interface as to the function to perform. The octal value of 01 indicates that the Message Send Function is requested; octal value 02 indicates that the caller is requesting to Register to receive a messages sent through the RLP; and octal value 03 indicates that the Deregister Function is requested. A Deregister request causes the RLP Software Interface to terminate all receiver processes which have registered to receive messages. Reserved bits 312 are bits 6 through 35 of word 1, and are reserved for future use and must be set to zero.

All of word 2 is dedicated to input to the RLP Software Interface and is related to the function indicated in word 1. Where the Request Type 310 function in word 1 is Message Send (01), bits 0 through 35 of word 2 indicate to which Host Processors the message should be sent. If bit 0 is set, the message will be sent to Host Processor A, if bit 1 is set, the message will be sent to Host Processor B, if bit 3 is set, the message will be sent to Host Processor C, and so on. Where the specified Request Type 310 is receiver registration (02) or receiver deregistration (03), word 2 is not used by the RLP Software Interface.

All of word 3 is used to indicate the Length of the second parameter passed to the RLP Software Interface. The current implementation requires that this Length be set to 6 as the second parameter is 6 words long.

Figure 5B:
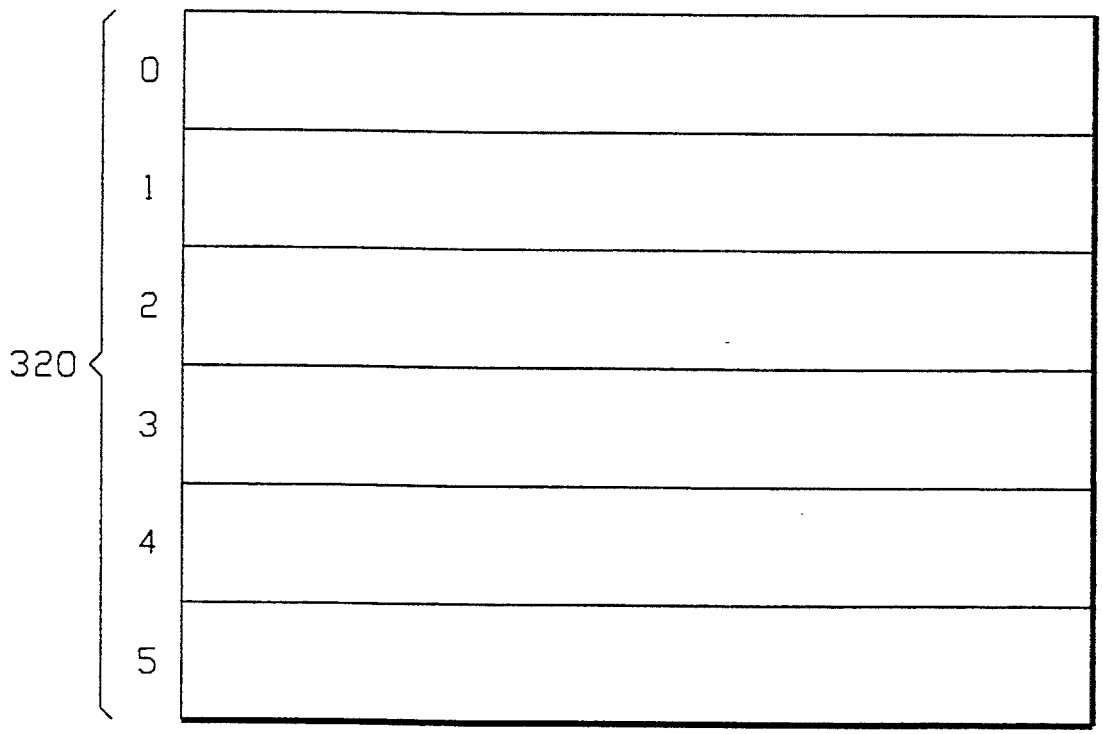
FIG. 5b illustrates the packet format for the second parameter passed to the RLP Software Interface, containing a message to send.

FIG. 5b illustrates the packet format for the second parameter passed to the RLP Software Interface, containing a message to send. The second parameter is a six word buffer 320 in which the calling routine places the message to be sent to the other Host Processors. Additionally, the buffer could include information such as an identifier for the program sending the message and the type of message. When the RLP Software Interface is called with the Register Function specified, the RLP Software Interface places messages received through the RLP in this second parameter.

Figure 6:
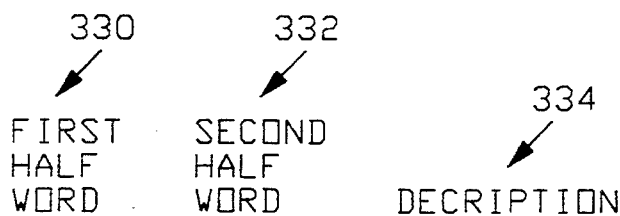
FIG. 6 is a table of the status codes returned from the RLP Software Interface, indicating the status of the operation.

FIG. 6 is a table of the status codes returned from the RLP Software Interface, indicating the status of the operation. Upon returning from the RLP Software Interface, a status code is placed in a status register in the Instruction Processor, known as register A0 (not shown) by the RLP Software Interface. Column 1 shown by arrow 330, of the table shows the first half-word (bits 0 through 17 in the Unisys 2200 architecture) of the returned status. For the purposes of the RLP Software Interface the first half word is always equal to 034067 octal when RLP Software Interface call has completed without detected error, and 734067 when an error has been detected.

A particular error status code is placed in the second half-word of register A0 (not shown), bits 18 through 35, by the RLP Software Interface. The second column, identified by arrow 332, shows the second half-word in decimal notation, used to identify the associated error conditions. The third column 334 contains a short description of the corresponding status code returned in the second half-word of register A0. With the information presented in the table, RLP Software Interface users can effectively determine the status of the call and take appropriate action.

Figure 7:
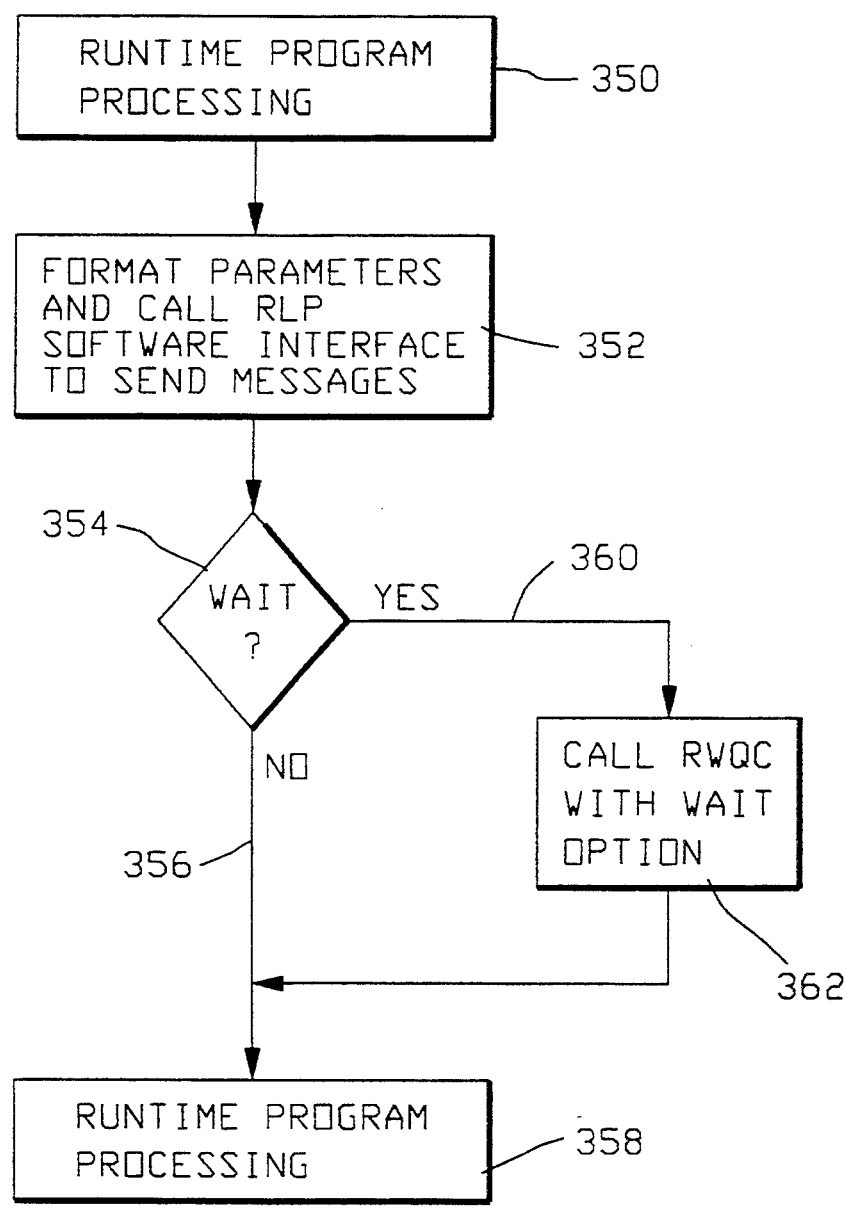
FIG. 7 is a flow chart of the processing for a Sending Application Program using the present invention to send a message.

FIG. 7 is a flow chart of the processing for a Sending Application Program using the present invention to send a message. The flow chart is shown to illustrate how any application program could structure its processing in using the present invention. The Sending Application Program could be any program, such as any of the Runtime Programs 28, 30, 32, or 34, which are part of the DBMS 24. Operation 350 shows application dependent processing for the Sending Application Program. Upon detection of the need to send a message to a program on another Host Processor 10, operation 352 formats the appropriate parameters and calls the RLP Software Interface with a message to send.

Test 354 determines whether the Sending Application Program should wait: for a response from those Host Processor(s) to which the message was sent. This determination is made on an application dependent basis. Control path 356 is taken if the decision to wait is negative, and operation 358 shows the Sending Application Program continuing its processing. Control path 360 is taken if the decision to wait for response(s) is affirmative. Operation 362 calls the Response Wait Queue Control (RWQC) with a wait operation specified, upon which the RWQC suspends execution of the Sending Application Program. Upon resumption of execution of the Sending Application Program, control is returned from the RWQC and the Sending Application Program continues with its processing at operation 358.

Figure 8:
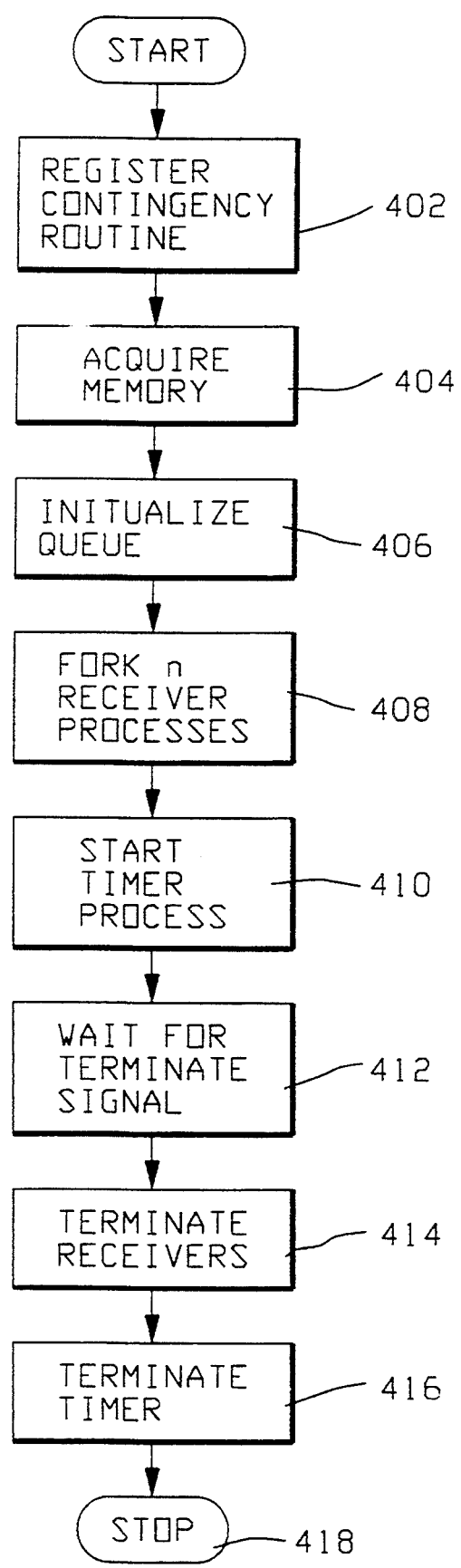
FIG. 8 is a flow chart for the Main Program of the present invention.

FIG. 8 is a flow chart for the Main Program of the present invention. Operation 402 Registers a Contingency Routine with the OS/2200 to handle conditions which may arise which are not dealt with in the normal processing logic. Specifically, the Contingency Routine takes control when errors, such as a references outside a program's address limits, are encountered during the execution of a program. In this application, the Contingency Routine ensures that information stored in various tables remains consistent with respect to programs which utilize them. Those skilled in the art will recognize that functions performed by a contingency routine depend upon both the application program related to the Contingency Routine and the context in which a particular error occurs.

Following registration of the Contingency Routine, operation 404 requests memory from the operating system to hold a queue and a message table which are used by the routines of the present invention. Operation 406 performs initialization of the queue by the Main Program.

Forking of one or more Receiver Processes 54 is accomplished by operation 408. The number of Receiver Processes that are started depends upon the number specified in a configuration parameter. The Receiver Processes which are started are designed to receive messages sent through the RLP. The Receiver Processes are discussed in greater detail in the description accompanying FIG. 9.

A Timer Process 56 is started at operation 410. The Timer Process is used to monitor a queue of processes which are waiting for responses to messages which have been sent to other Host Processors which are coupled to the RLP. A globally viewed Terminate Flag is cleared along with starting the Timer Process. The Terminate Flag as a signal to the Timer Process when processing should stop. The operations of the Timer Process and the queues involved are discussed further with FIG. 11, FIG. 12, and FIG. 15.

After the appropriate initializations are complete and the processes have been started, operation 412 suspends the Main Program to await a termination signal. As the Main program is implemented under OS/2200, it has been designed to receive the termination signal which is initiated from the operator console for the Host Processor. Those skilled in the art will recognize that alternate and comparable means for signalling the Main program are available, both under OS/2200 as well as other operating systems.

Once a termination signal is received, Terminate Receiver operation 414 begins the termination process by terminating the Receiver Processes. The Terminate Timer operation 416 then sets the Terminate Flag which is a signal to the Timer Process to stop processing, and finally, operation 418 stops the Main Program.

Figure 9:
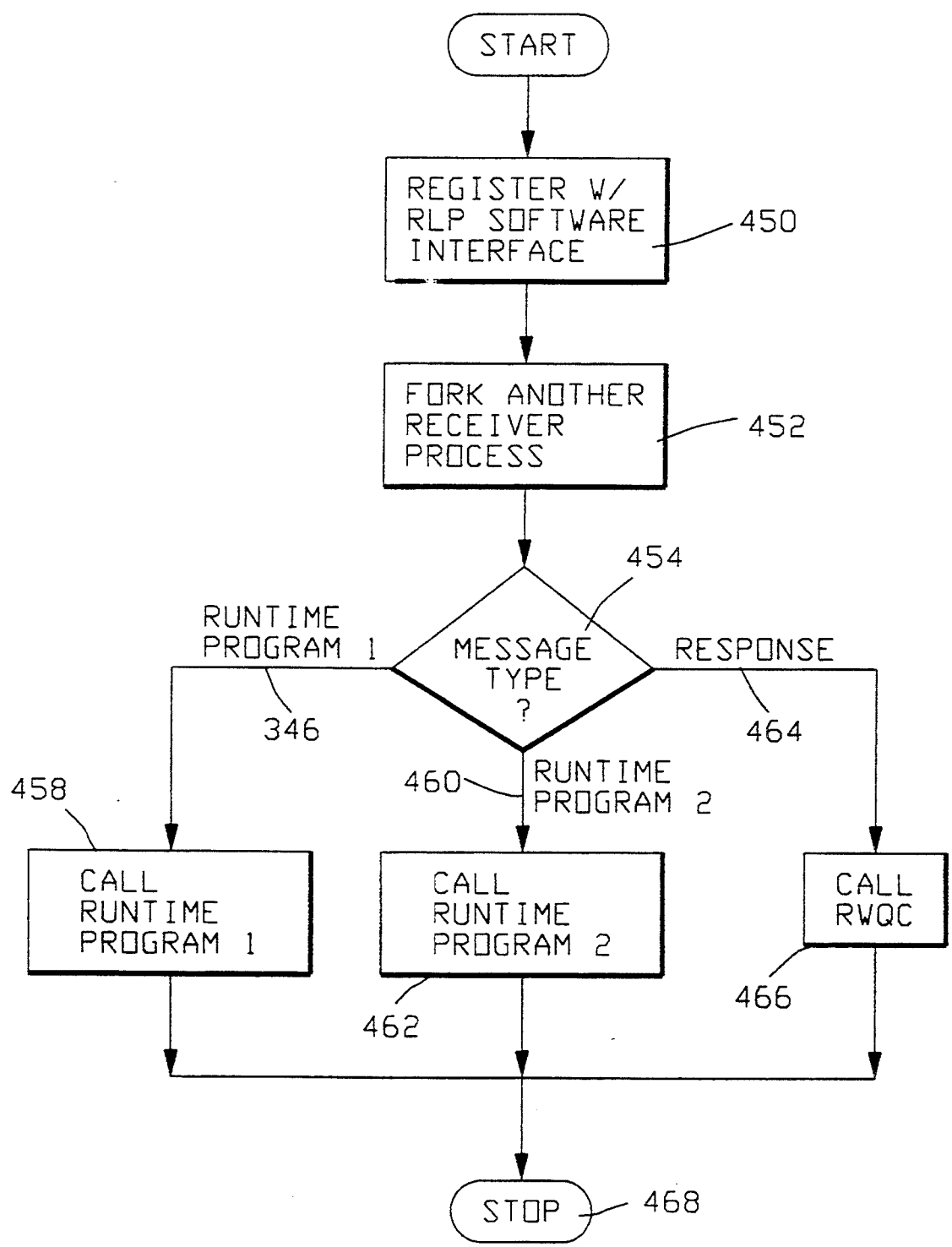
FIG. 9 is a flow chart for the Receiver Process that receives messages sent through a Record Lock Processor.

FIG. 9 is a flow chart for the Receiver Process that receives messages sent through a Record Lock Processor. As previously stated, there may be one or more Receiver Processes started by the Main Program, each identical to the others in its processing logic. The purpose for having a plurality of Receiver Processes is to ensure that a Receiver Process is immediately available when messages from the RLP arrive. The Receiver Processes are responsible for processing messages passed through the RLP, and calling the appropriate software routine as defined by the message received.

The first operation 450 performed by each Receiver Process is to perform a RLP Software Interface call with the Register Function specified. After making the Register request, the RLP Software Interface suspends execution of the Receiver Process until a message is received from the RLP. Upon receipt of a message, the RLP Software Interface enters the message received in the second parameter provided by the Receiver Process. Execution of the Receiver Process is then resumed at step 452.

The first action 452 taken by the Receiver Process after resumption of execution is to start another Receiver Process. This is done to ensure that there is another Receiver Process available to receive a message once the resumed Receiver Process has begun processing a message.

After starting another Receiver Process, test 454 determines what the of message has been received. The message type is part of the message placed in the second parameter by the RLP Software Interface and is application program dependent. Other application programs passing messages using the present invention could vary message types accordingly. This implementation of the Receiver Process shows three possible message types, each indicating a particular routine to call: 1) if the type is "Runtime Program 1", control path 456 leads to operation 458 which calls Runtime Program 1; 2) if the type is "Runtime Program 2", control path 460 leads to operation 462 calling Runtime Program 2; and 3) if the type is a "RESPONSE", control path 464 leads to operation 466 calling the Response Wait Queue Control. The Receiver Process could easily be adapted to call any number of runtime programs depending on the message type. Upon returning from the selected routine, the Receiver Process completes execution at 468.

Figure 10A:
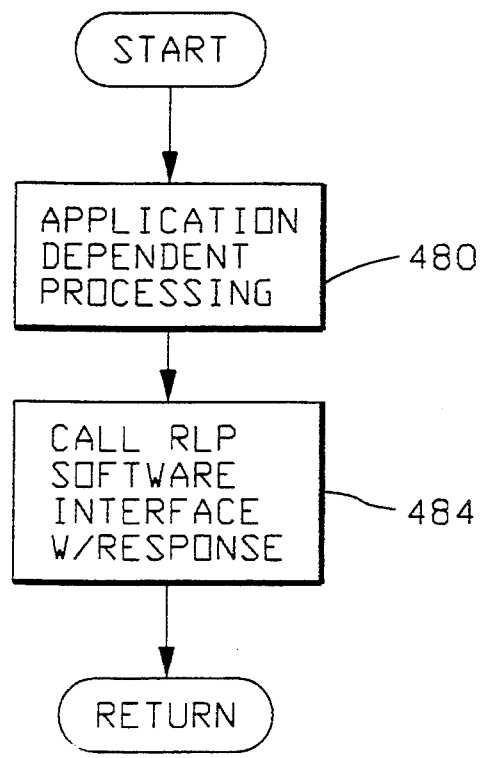
FIG. 10a is a flow chart for the application dependent processing of a First Receiving Application Program.
Figure 10B:
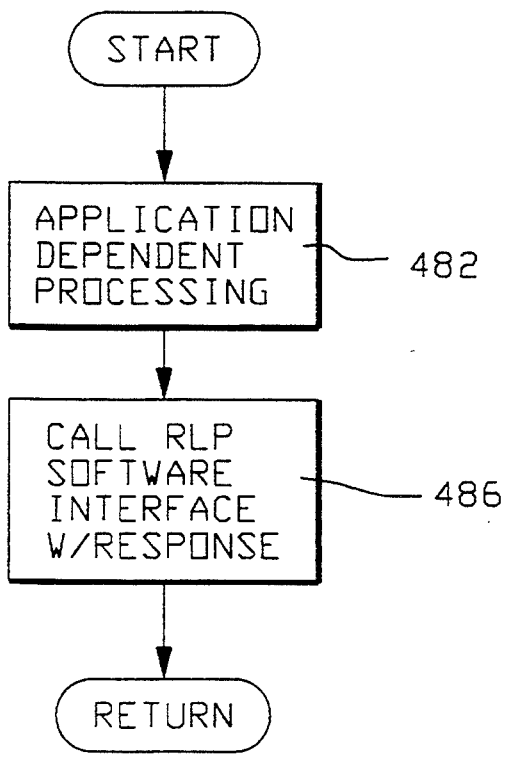
FIG. 10b is a flow chart for the application dependent processing of a Second Receiving Application Program.

FIG. 10a is a flow chart for the application dependent processing of a first Receiving Application Program, and FIG. 10b is a flow chart for the application dependent processing of a second Receiving Application Program. For DBMS 24, each Receiving Application Program could be one of Runtime Programs 28, 30, 32, or 34. The basic processing flow for each program is essentially similar to the other. Operation 480 of FIG. 10a, entails application dependent processing by the First Receiving Application Program. Using the first Example discussed in the Background description, this could entail updating a table with an appropriate file status. Operation 482 of FIG. 10b, entails application dependent processing by a Second Receiving Application Program. As discussed in the second example of the Background description, this might include determining the oldest start time of an application program. Each routine, upon completion of the application dependent processing, formats parameters and calls the RLP Software Interface 36 with a response type message, as indicated by operations 484 and 486 respectively. The response type is indicated in the second parameter passed to the RLP Software Interface. Upon receipt of the response at the Host Processor of the Sending Application Program, a Receiver Process on the receiving Host Processor is activated by the RLP Software Interface to process the response.

The Response Wait Queue Control (RWQC) 52 maintains a queue of programs which have sent messages and are awaiting responses. Three functions are provided to calling programs: 1) a Timeout Function to check for programs awaiting responses and restart them based on the length of the wait; 2) a Response Function to match a response message with the appropriate waiting program; and 3) an Enqueue Function to place the program on the Queue as needed.

Figure 11:
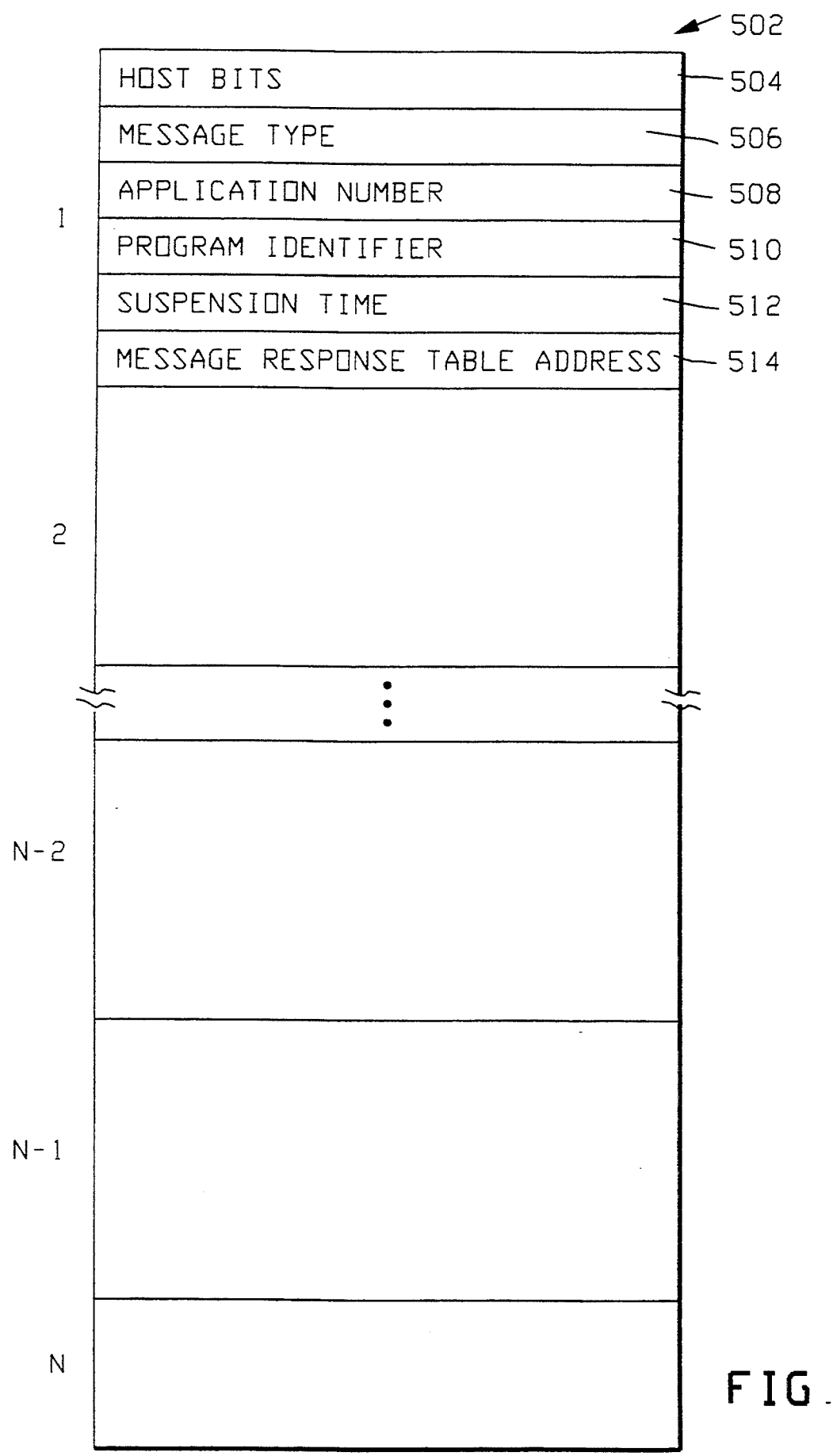
FIG. 11 illustrates the structure of the Message Response Wait Queue that holds application program identification information for suspended application programs.

FIG. 11 illustrates the structure of the Message Response Wait Queue 502 that holds application program identification information for suspended application programs. This is a structure, having 1 through n elements, in which each element of the Queue contains information pertaining to a program which has sent a message and is waiting for one or more responses before resuming execution. After sending a message, a Sending Application Program may call the Response Wait Queue Control with a Wait Function. When the wait option is specified, the program sending the message is suspended and information pertaining to the suspended program is placed in an element of the Queue. When a response is received, a Receiver Process 54 will call the RWQC with the response message. The RWQC searches the Message Response Wait Queue for an element which matches the information contained in the response message. If an element is found, the queue element is marked as having received a response. When all responses for which a program is waiting are received, the element is removed from the Queue and program execution is resumed.

Each element of the Queue 502 contains six pieces of information regarding a suspended process. The first field shown is that for containing the Host Bits 504. When a program sends a message, the Host Bits are set to indicate to which Host Processors the sending program specified the message should be sent and from which Host Processors a response message is expected. As response messages are received from the various Host Processors, the corresponding Host Bit is cleared in this field to indicate that a response message has been received. When all the Host Bits are cleared, the suspended program can resume execution.

The second field in a queue element is the Message Type 506. The type specified in this field is dependent upon the application program sending the message and its needs for tracking the Message Type. When the Message Type field is set to NULL, a queue element is available for use by another process. When a response message is being processed, the Message Type field can be used as an additional verification that the response message matches the queue element.

The third field in a Queue element is the Application Number 508. This field, like the Message Type field, can be used as an additional check in matching a response message with a Queue element.

Shown in the fourth field is the Program Identifier 510. This field is used to identify a program which is expecting a response to a message. When the response arrives, part of the information in the response is the Program Identifier. The information in the response can be matched against the information in the queue element to determine whether or not the response is to the message sent by the suspended process.

The Suspension Time 512 is stored in the fifth field of a Queue element. This field is used to mark the time at which a program was suspended. The Response Wait Queue Control (RWQC) Timeout Function can then be used to resume execution of this program if it has been waiting for a response for more than a predetermined period of time. In the preferred embodiment, the system clock time is obtained from the operating system to store in this field.

The sixth field in a Queue element is assigned the Message Response Table Address 514. When a response is received, the response message is placed in an addressable table of response messages which can then be used by the resumed process.

Those skilled in the art will recognize that additional or different information could be stored in a queue element without departing from the scope of the present invention, depending upon the particular needs of the application.

Figure 12:
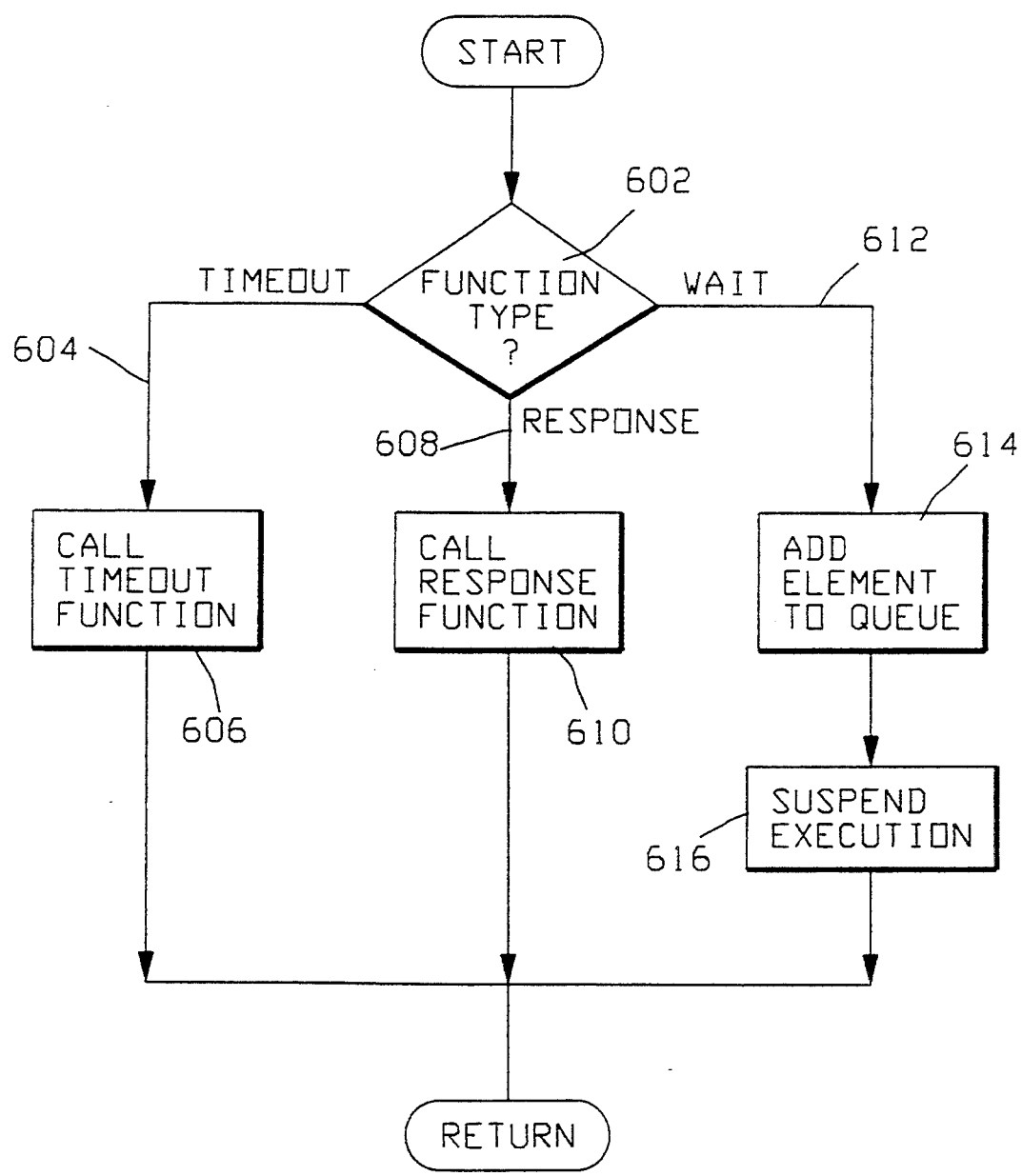
FIG. 12 is a flow chart for the Response Wait Queue Control routine that manages the Message Response Wait Queue.

FIG. 12 is a flow chart for the Response Wait Queue Control (RWQC) routine that manages the Message Response Wait Queue. The RWQC is called with a parameter which indicates which function to perform. Test 602 determines the Function Type. If the Function Type specified is the Timeout Function, control path 604 leads to operation 606 which calls the Timeout Function. If test 602 finds a Response Function request, control path 608 leads to operation 610 which calls the Response Function. Finally, if test 602 finds that the caller specified the Wait Function, control path 612 leads to operation 614 where an element is added to the Queue 502 with the appropriate information. After the addition of the queue element, operation 616 suspends execution of the calling program. When all responses have been received, execution will resume.

Figure 13:
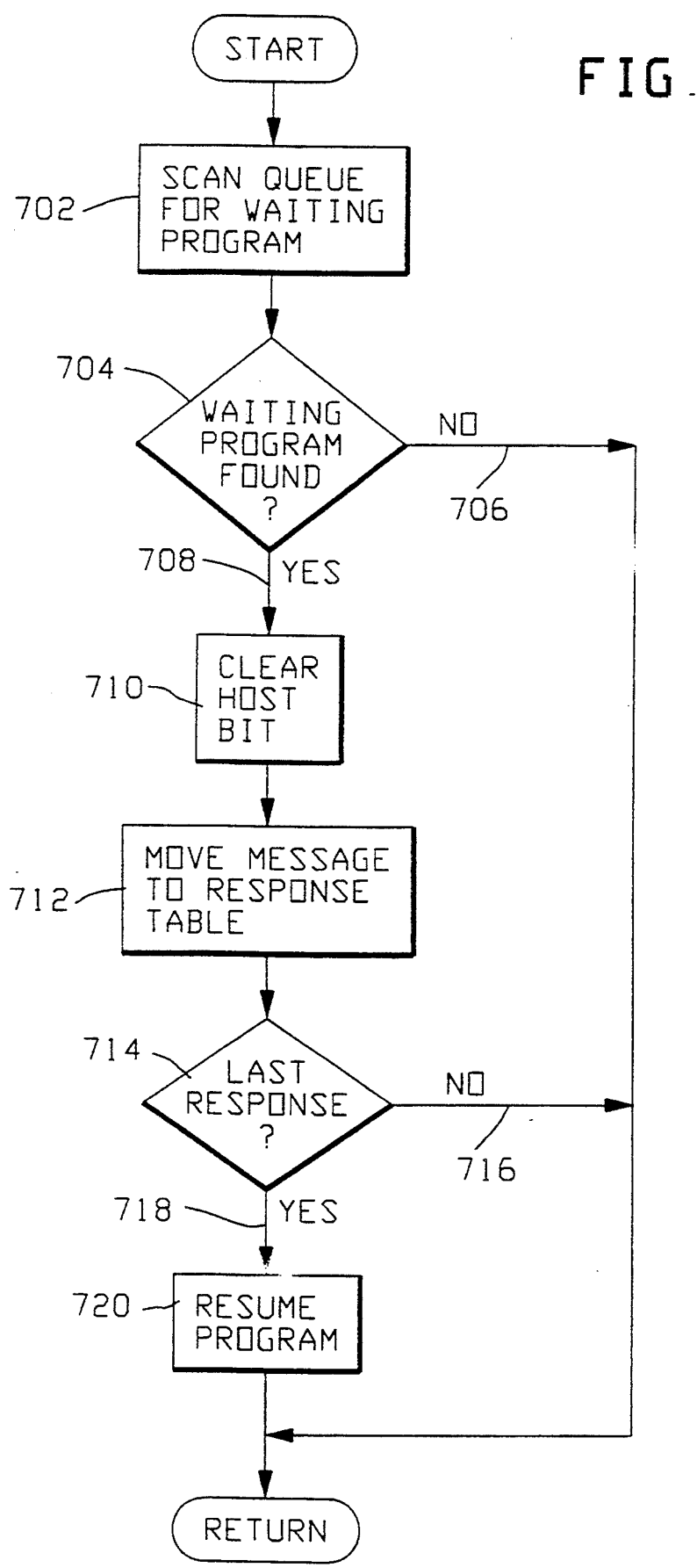
FIG. 13 is a flow chart for the Response Function that processes messages received and identified as response type messages.

FIG. 13 is a flow chart for the Response Function that processes messages received and identified as response type messages. This function is performed when a Receiver Process has received a response message and has called the RWQC to process the response message. Operation 702 scans the Queue of processes waiting for response message in search of an element in the Queue which has a Program Identifier 512 (See FIG. 11) which matches the Program Identifier in the response message. For the application using this invention (a DBMS), the sending programs places the Program Identifier in the second parameter (FIG. 5b) passed to the RLP Software Interface. The program receiving the message, and sending the response, places the same Program Identifier into the second parameter of its call to the RWQC routine.

Test 704 checks whether a matching Queue element was found. If not, the response message is ignored and control path 706 leads to control being returned to the calling routine. If a matching program is found in the Queue, control path 708 leads to operation 710. Operation 710 clears the Host Processor identifying bit, in the Host Bit field 504 (FIG. 11), corresponding to the Host Processor sending the response, signifying that the application program on the particular Host Processor has responded.

The response message is moved to the Message Response Table (to be discussed with FIG. 14) by operation 712. The location in the Message Response Table is determined by the Message Response Table Address 514 specified in the selected Queue element.

After the response message has been copied to the Message Response Table, test 714 checks whether all responses have been received. When all the Host Bits 504 in the selected Queue element are cleared, the indication is that all expected responses have been received. If there are still outstanding responses, control path 716 leads to return of control to the calling routine. If all responses have been received, control path 718 leads to operation 720 which resumes execution of the program corresponding to the Queue element selected, and control is subsequently returned to the calling routine.

Figure 14:
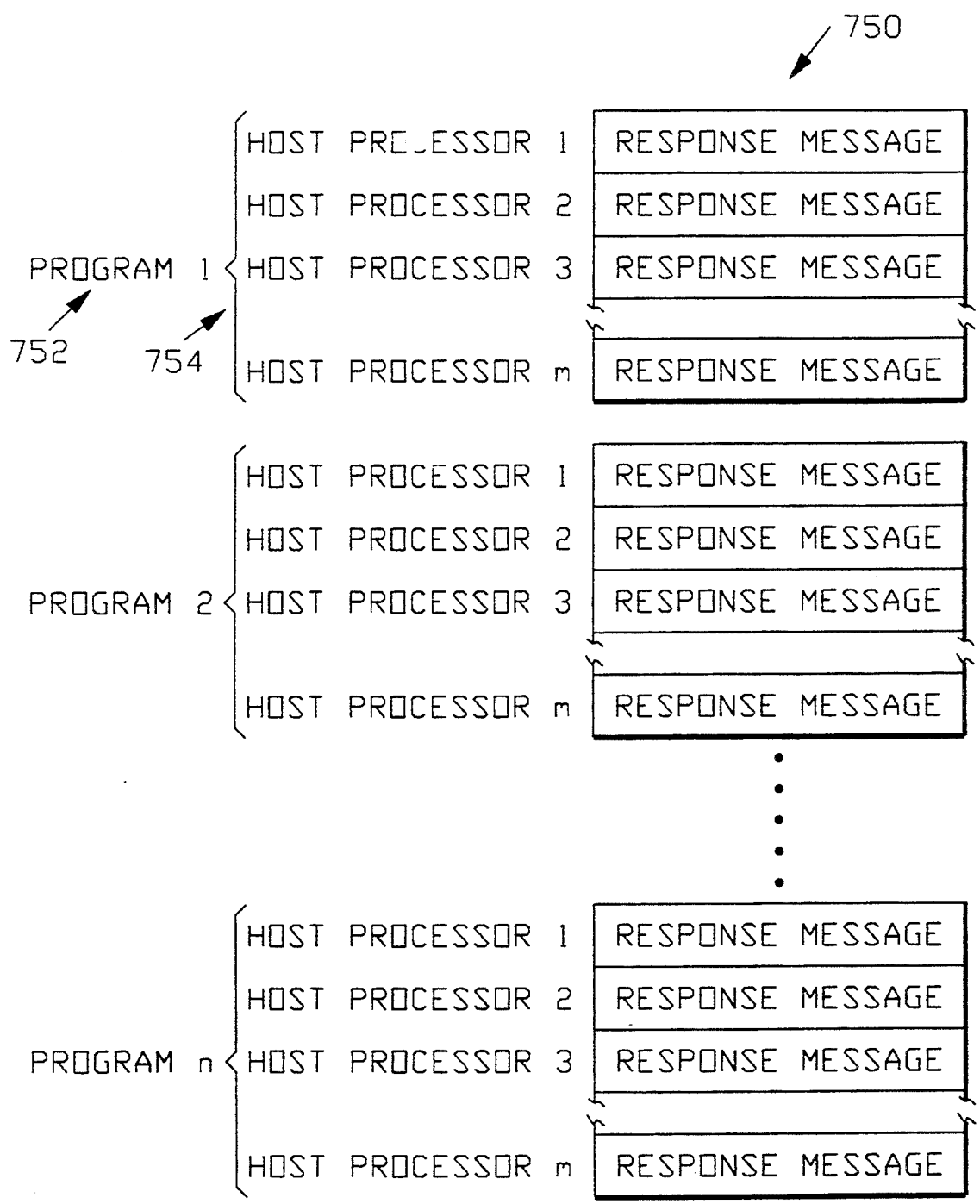
FIG. 14 illustrates the structure of the Message Response Table that holds messages sent in response to an original message sent from an application program.

FIG. 14 illustrates the structure of a Message Response Table 750. For a Sending Application Program 752 that expects a response message from a program on the receiving Host Processor(s), the response message(s) returned is placed in a Message Response Table corresponding to the program expecting the response. Because there may be more than one Sending Application Program waiting for a response, a Message Response Table is created for each Sending Application Program that requires response messages be saved. When an application program sends a message and a response from the appropriate application program executing on another Host Processor is received, the contents of the response message are copied to the appropriate Response Table.

Each table is structured such that m entries 754 in the table are reserved for response messages, where m is the number of Host Processors in which programs are involved in message passing. When a program is suspended to wait for messages in response to the original message sent, the address of the Response Table for the suspended program is placed in the Message Response Table Address field 514 of the Queue element. When response messages are received, they are placed in the table entry corresponding to the responding Host Processor based on the Message Response Table Address.

Figure 15:
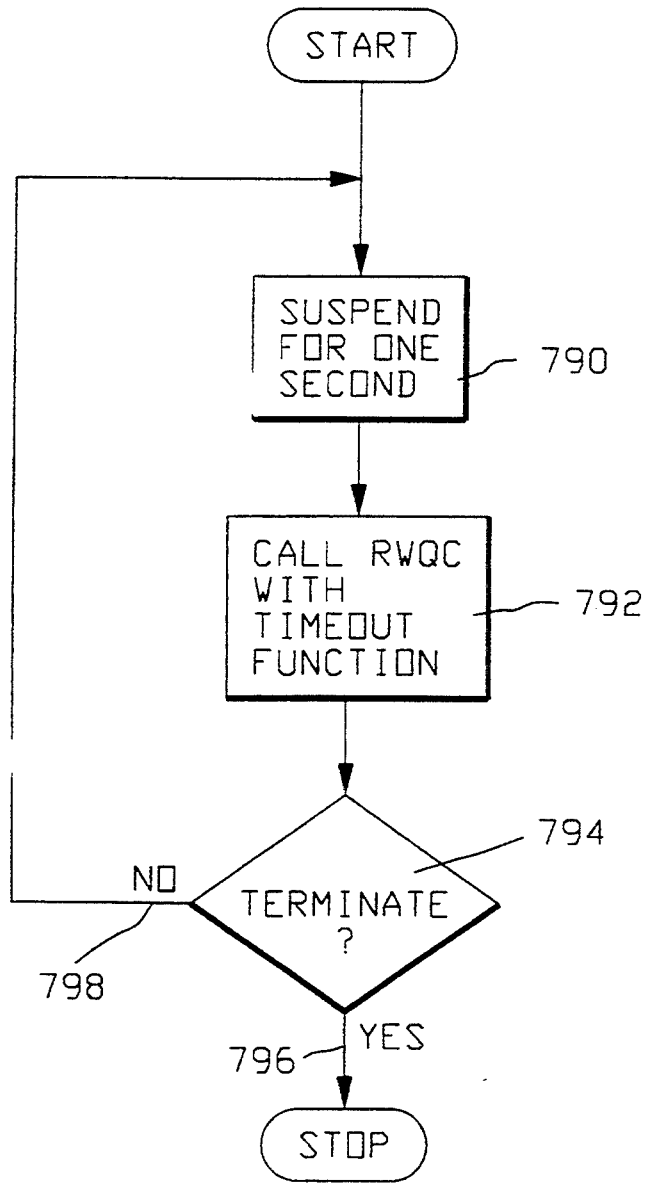
FIG. 15 is a flow chart of the Timer Process which periodically calls the Response Wait Queue Control Timeout Function.

FIG. 15 is a flow chart of the Timer Process 56 (See FIG. 2) which periodically calls the Response Wait Queue Control Timeout Function. Operation 790 suspends execution of the Timer Process for one second by calling the operating system. This value could be adjusted according to application needs. After one second has passed, the operating system resumes execution of the Timer Process and proceeds to operation 792. At operation 792, the Response Wait Queue Control (RWQC) is called with the Timeout Function (See FIGS. 12 and 16) to check the Queue of suspended programs for those which have been waiting for an extended length of time for a response message. Upon completion of the Timeout Function, test 794 checks whether the global Terminate Flag has been set. If the flag has been set, control path 796 it taken and processing stops. If the Terminate Flag is clear, control path 798 returns to operation 790, where execution of the Timer Process is again suspended.

Figure 16:
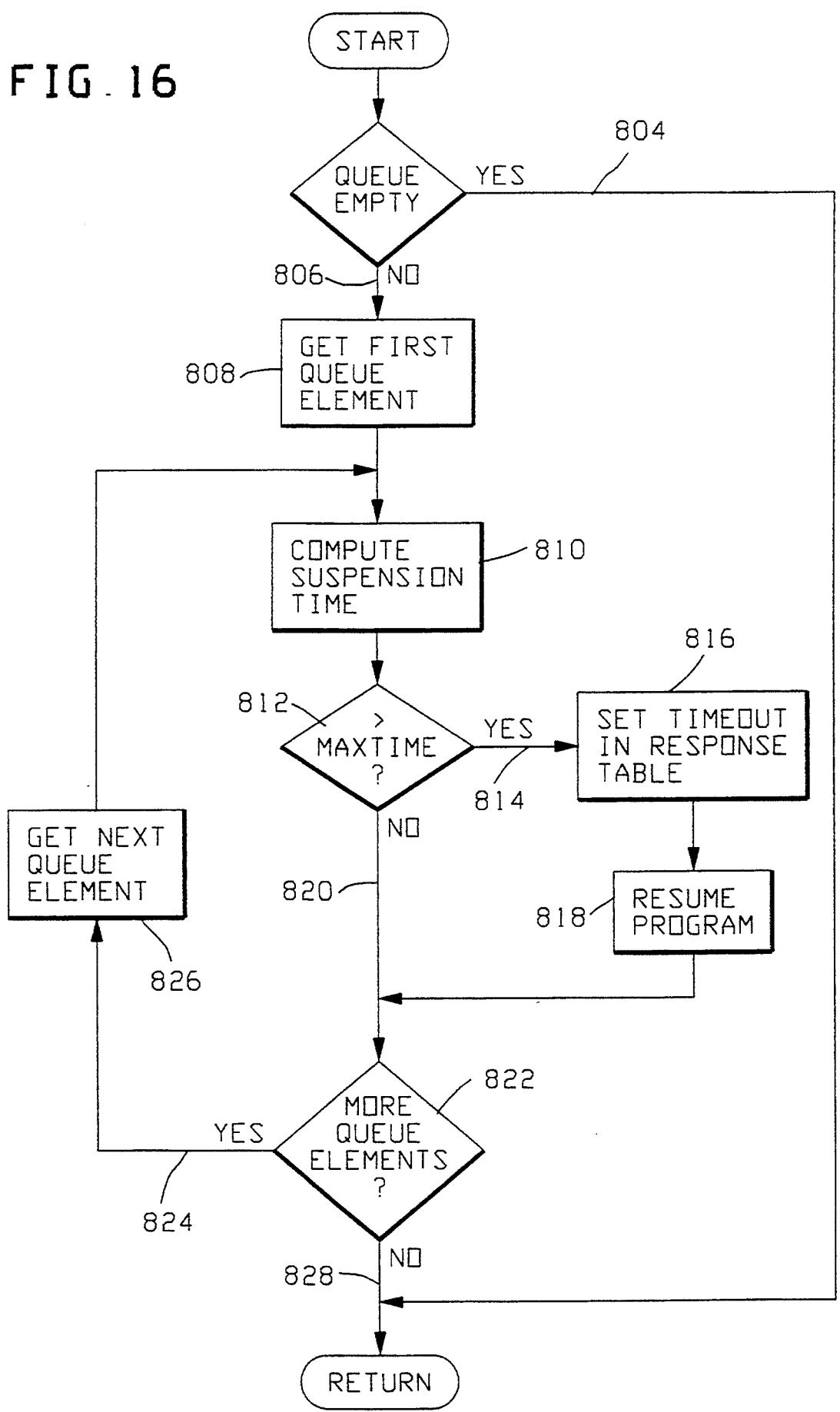
FIG. 16 is a flow chart for the Timeout Function that checks the Message Response Wait Queue for suspended application programs which are waiting for response messages.

FIG. 16 is a flow chart for the Timeout Function that checks the Message Response Wait Queue for suspended application programs which are waiting for response messages. The Timeout Function is used to detect processes which have been waiting for an extended period of time for one or more responses. When a program has been suspended for longer than a predetermined period of time, the Timeout Function will resume execution of the suspended program.

Test 802 checks whether the Queue is empty. If the Queue is empty, control is returned to the calling routine as shown by control path 804. If the Queue is not empty, control path. 806 leads to retrieval of the first element of the Queue by operation 808.

After retrieving a Queue element, operation 810 computes the time for which the program has been suspended. This computation is made using the Suspension Time field 512 (FIG. 11) in the Queue element selected as compared to the current system clock time obtained from the operating system. Test 812 checks whether the time for which the program has been suspended is greater than some predetermined maximum period of time; in the preferred embodiment, the predetermined time is 20,000 milliseconds. When this maximum time period is exceeded, control path 814 leads to operation 816, which copies a timeout response message to the Message Response Table 750 at the Message Response Table Address 514. Operation 818 resumes execution of the suspended program. If test 812 finds that the suspension time is less than the predetermined maximum period of time, no operation is performed and control path 820 leads to test 822.

Test 822 checks for more Queue elements. If there are more queue elements to process, control path 824 leads to operation 826, which retrieves the next Queue element and processing continues with operation 810. When all Queue elements have been processed, control path 828 is taken and control is returned to the calling routine.

Having described the preferred embodiment of the present invention, it should be understood that those skilled in the art will recognize that alternate embodiments exists which fall within the scope and spirit of the appended claims.

What is claimed is:

1. In a closely coupled data processing system including a plurality of host processors for executing a plurality of application programs, an apparatus for passing messages between the plurality of application programs on the plurality of host processors, comprising:

a record lock processor directly coupled to each of the plurality of host processors for coordinating locks on data objects shared between the plurality of application programs and for transferring messages in an essentially point-to-point fashion between the plurality of host processors;

a plurality of interface managers, wherein each of the plurality of host processors includes a selected one of said plurality of interface managers, and each of said plurality of interface managers is interfaced with said record lock processor and is responsive to messages received from and messages to send to application programs executing on others of the host processors;

a plurality of receiver means wherein each of the plurality of host processors includes selected ones of said plurality of receiver means and each of said plurality of receiver means is responsively coupled to a selected one of said plurality of interface managers, whereby each of said plurality of receiver means is responsive to a message received by said selected one of said plurality of interface managers, wherein each of said plurality of receiver processes is interfaced with selected ones of the plurality of application programs, wherein a selectable function of an application program is directly activated by one of said plurality of receiver means when a message is received;

wherein each of said plurality of interface managers include registration means responsive to selected ones of said plurality of receiver means for registering said selected ones of said plurality of receiver means with said each of said plurality of interface managers and suspending processing by said selected ones of said plurality of receiver means, whereby one of said plurality of receiver means is activated by an interface manager after said interface manager has received a message;

wherein each of the plurality of host processors includes control means responsive to selected ones of the plurality of application programs and responsive to selected ones of said plurality of receiver means for suspending execution of said selected ones of the plurality of application programs when a response-message is required, and for activating a suspended application program when a response-message is received by a receiver means;

a message response wait queue interfaced with said control means, wherein each entry in said message response wait queue identifies an application program which has been suspended by said control means;

a message response table corresponding to each application program suspended by said control means, wherein said message response table is interfaced with said control means, is referenced by an entry in said message response wait queue, and each entry in said message response table contains a response-message from one of the plurality of host processors.

2. In a closely coupled data processing system including a first host processor for executing a first application program and a second host processor for executing a second application program, a record lock processor directly coupled to the first and second host processors for locking data objects that are shared between the first and second application programs and for transferring messages in essentially a point-to-point fashion between the first and second host processors, a first record lock processor interface available on the first host processor and communicatively coupled to the record lock processor, and a second record lock processor interface available on the second host processor and communicatively coupled to the record lock processor, wherein the first and second record lock processor interfaces provide for sending and receiving messages between the first and second host processors, a method for passing messages between the first application program and the second application program, comprising the steps of:
- registering a first receiver process with the first record lock processor interface on the first host processor, whereby said first receiver process is available to process a message received by the first record lock processor interface;
- suspending execution of said first receiver process until a message is received by the first record lock processor interface;
- registering a second receiver process with the second record lock processor interface on the second host processor, whereby said second receiver process is available to process a message received by the second record lock processor interface;
- suspending execution of said second receiver process until a message is received by the second record lock processor interface;
- invoking the first record lock processor interface with a message to send from the first application program to the second application program and a function code indicating a send operation;
- transferring a message from the first record lock processor interface to the record lock processor;
- transferring the message from the record lock processor to the second record lock processor interface;
- providing a message received by the second record lock processor interface to said second receiver process when the message is received by the second record lock processor interface;
- activating said second receiver process when a message is received by the second record lock processor interface; and
- providing the message from said second receiver process to the second application program after said activating step.

3. The method of claim 2, further comprising the steps of:
- optionally suspending the first application program after said invoking the first record lock processor interface step;
- invoking the second record lock processor interface with a response-type message to send from the second application program to the first application program and a function code indicating a send operation;
- providing a message received by the first record lock processor interface to said first receiver process when the message is received by the first record lock processor interface;
- activating said first receiver process when a message is received by the first record lock processor interface; and
- resuming execution of the first application program if the message is response-type.

4. The data processing of claim 3, further comprising the step of resuming execution of the first application program if it has been suspended longer than a predetermined length of time.

5. The method of claim 3, further comprising the step of starting a new receiver process when said first receiver process is activated, whereby said new receiver process is available to process a message received by the first record lock processor interface.

6. In a closely coupled data processing system including a plurality of host processors for executing a plurality of application programs, a record lock processor directly coupled to the plurality of host processors for coordinating locks on data objects and for passing messages between application programs on different ones of the plurality of host processors, and a plurality of record lock processor interfaces operable on each of the plurality of host processors and communicatively coupled to the record lock processor, a method for passing messages between the plurality of application programs, comprising the steps of:
- registering a plurality of receiver processes with each of the plurality of record lock processor interfaces, whereby each of said plurality of receiver processes is available to process a message received by the record lock processor interface with which said each of said plurality of receiver processes is registered;
- suspending execution of each of said plurality of receiver processes;
- invoking a selected one of the plurality of record lock processor interfaces with a message to send from one of the plurality of application programs to another application program, a function code indicating a send operation, and a code indicative of which of the plurality of host processors to which the message is to be sent;
- transferring a message frown said selected one of the plurality of record lock processor interfaces to the record lock processor;
- transferring a message from the record lock processor to selectable ones of the plurality of record lock processor interfaces;
- providing a message received by one of the plurality of record lock processor interfaces to an associated one of said plurality of receiver processes;
- activating one of said plurality of receiver processes when a message is received by the record lock processor interface with which said one of said plurality of receiver processes is registered;
- providing a message received by one of the plurality of said receiver processes to a selected one of the plurality of application programs after said activating step;
- optionally suspending an application program after said invoking the first record lock processor interface step;
- adding an entry for the application program from said suspending step to a message response wait queue;
- invoking a selected one of the plurality of record lock processor interfaces with a response-message to send from one of the plurality of application programs to another of the plurality of application programs and a function code indicating a send operation;
- adding said response-message to a message response table associated with the application program from said suspending step;
- resuming execution of the first application program if the message is response-type.

7. In a closely coupled data processing system including a plurality of host processors for executing a plurality of application programs, a record lock processor directly coupled to the plurality of host processors for coordinating locks on data objects and for passing messages between application programs on different ones of the plurality of host processors, and a plurality of record lock processor interfaces operable on each of the plurality of host processors and communicatively coupled to the record lock processor, a method for passing messages between the plurality of application programs, comprising the steps of:

registering a receiver process with each of the plurality of record lock processor interfaces, whereby each said receiver process is available to process a message received by the record lock processor interface with which said each said receiver process is registered;

suspending execution of each said receiver process;

invoking a selected one of the plurality of record lock processor interfaces with a message to send from one of the plurality of application programs to another application program, a function code indicating a send operation, and a code indicative of which of the plurality of host processors to which the message is to be sent;

providing a message received by one of the plurality of record lock processor interfaces to an associated receiver process;

activating one receiver process when a message is received by the record lock processor interface with which said one receiver process is registered;

providing a message received by a receiver process to a selected one of the plurality of application programs after said activating step;

optionally suspending an application program after said invoking the first record lock processor interface step;

adding an entry for the application program from said suspending step to a message response wait queue;

invoking a selected one of the plurality of record lock processor interfaces with a response-message to send from one of the plurality of application programs to another of the plurality of application programs and a function code indicating a send operation;

adding said response-message to a message response table associated with the application program from said suspending step;

resuming execution of the first application program if the message is response-type.

* * * * *